United States Patent [19]

Cooper et al.

[11] Patent Number: 4,959,769

[45] Date of Patent: Sep. 25, 1990

[54] STRUCTURES AND METHODS FOR REPRESENTING AND PROCESSING DOCUMENTS

[75] Inventors: James L. Cooper; Marc D. San Soucie, both of Tyngsboro, Mass.

[73] Assignee: Wang Laboratories, Inc., Lowell, Mass.

[21] Appl. No.: 122,594

[22] Filed: Nov. 17, 1987

Related U.S. Application Data

[63] Continuation of Ser. No. 656,831, Oct. 2, 1984, abandoned, which is a continuation-in-part of Ser. No. 538,644, Oct. 3, 1983.

[51] Int. Cl.$^5$ .............................. G06F 15/20
[52] U.S. Cl. ................. 364/200; 364/225.6; 364/248.1; 364/236.2; 364/238.4; 364/234; 364/237.2
[58] Field of Search ... 364/200 MS File, 900 MS File; 400/63, 76

[56] References Cited

U.S. PATENT DOCUMENTS

| | | | |
|---|---|---|---|
| 4,068,300 | 1/1978 | Bachman | 364/200 |
| 4,429,372 | 1/1984 | Berry et al. | 364/900 |
| 4,441,829 | 4/1984 | Herbert, Jr. et al. | 364/900 |
| 4,445,795 | 5/1984 | Levine et al. | 400/63 |
| 4,451,900 | 5/1984 | Mayer et al. | 364/900 |
| 4,454,576 | 6/1984 | McInroy et al. | 364/200 |
| 4,464,730 | 8/1984 | Lawrence et al. | 364/900 |
| 4,470,129 | 9/1984 | Disbrow et al. | 364/900 |
| 4,491,933 | 1/1985 | Ursin et al. | 364/900 |
| 4,495,490 | 1/1985 | Hopper et al. | 340/750 X |
| 4,503,515 | 3/1985 | Cuan et al. | 364/900 |
| 4,513,391 | 4/1985 | Maddock | 364/900 |
| 4,539,653 | 9/1985 | Bartlett et al. | 364/900 |
| 4,553,206 | 11/1985 | Smutek et al. | 364/300 |
| 4,553,860 | 11/1985 | Imaizumi et al. | 364/900 |
| 4,606,002 | 8/1986 | Waisman et al. | 364/200 |
| 4,620,295 | 10/1986 | Aiken, Jr. | 364/900 |
| 4,633,430 | 12/1986 | Cooper | 364/900 |
| 4,648,067 | 3/1987 | Repass et al. | 364/900 |
| 4,648,071 | 3/1987 | Repass et al. | 364/900 |
| 4,713,754 | 12/1987 | Agarwal et al. | 364/200 |
| 4,751,740 | 6/1988 | Wright | 364/900 |

FOREIGN PATENT DOCUMENTS 58-51348  3/1983  Japan .

OTHER PUBLICATIONS

James Martin, Computer Data-Base Organization, 1975, pp. 229-230, 267-270, Prentice-Hall, Inc., Englewood Cliffs, N.J.

D. S. Batory et al., "A Unifying Model of Physical Databases", ACM Transactions on Database Systems, vol. 7, No. 4, Dec. 1982, pp. 509-539.

R. L. Johnsen et al., "DASD Retrieval Via Outboard Multilevel Index Scan", IBM Technical Disclosure Bulletin, vol. 22, No. 1, 6/79, pp. 339-341.

A. Balaram et al., "Text Coprocessor Brings Quality to CRT Displays", Electronic Design, vol. 31, No. 4, Feb. 17th, 1983, pp. 113-120.

Applicant's Disclosure of his proprietary prior-art Document Structure.

*Primary Examiner*—Raulfe B. Zache
*Attorney, Agent, or Firm*—Michael H. Shanahan; Scott K. Peterson

[57] ABSTRACT

A document processing system including a document structure and a library of routines for manipulating the document structure. The components of the document structure are made up of individually-locatable blocks. The components include a chain of text blocks which contains at least one document page and includes at least one block, one or more chains of reference blocks, each chain containing a reference and including at least one reference block, information attributes in the text blocks which relate locations in the text of the document to item numbers referring to references, a page index which relates page numbers to the text blocks at which the pages begin, and a reference index which relates each item number to the first reference block in the chain containing the reference. The document structure may only be manipulated by means of routines in the document manager library. The routines in the library are accessible to programs such as editor programs and printing programs which manipulate documents.

22 Claims, 13 Drawing Sheets

SYSTEM CONTROL STRUCTURE

FIG. 3 CONTROL AND DATA STRUCTURE

DOCUMENT STRUCTURE

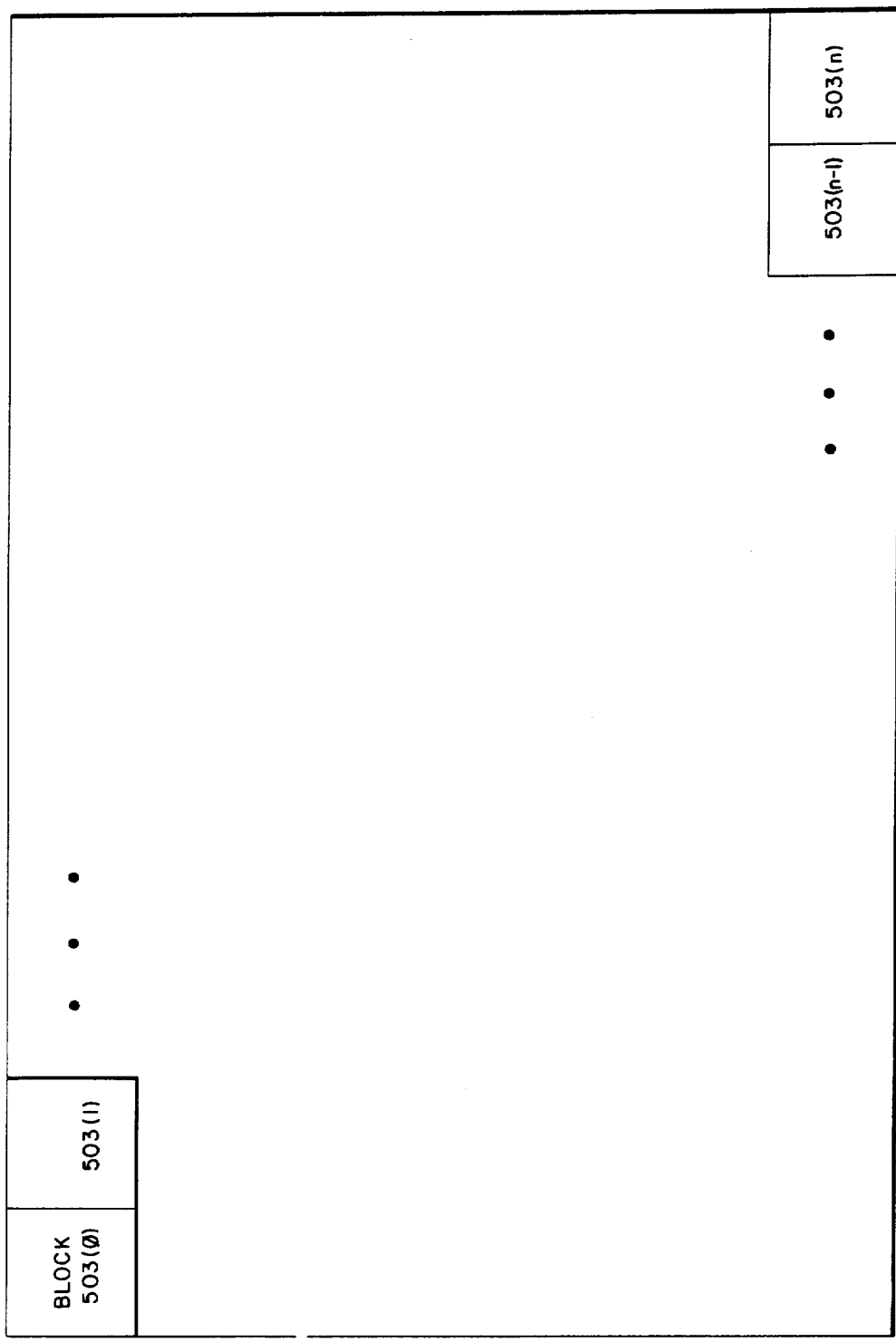
FIG. 5 STRUCTURE OF A DOCUMENT FILE

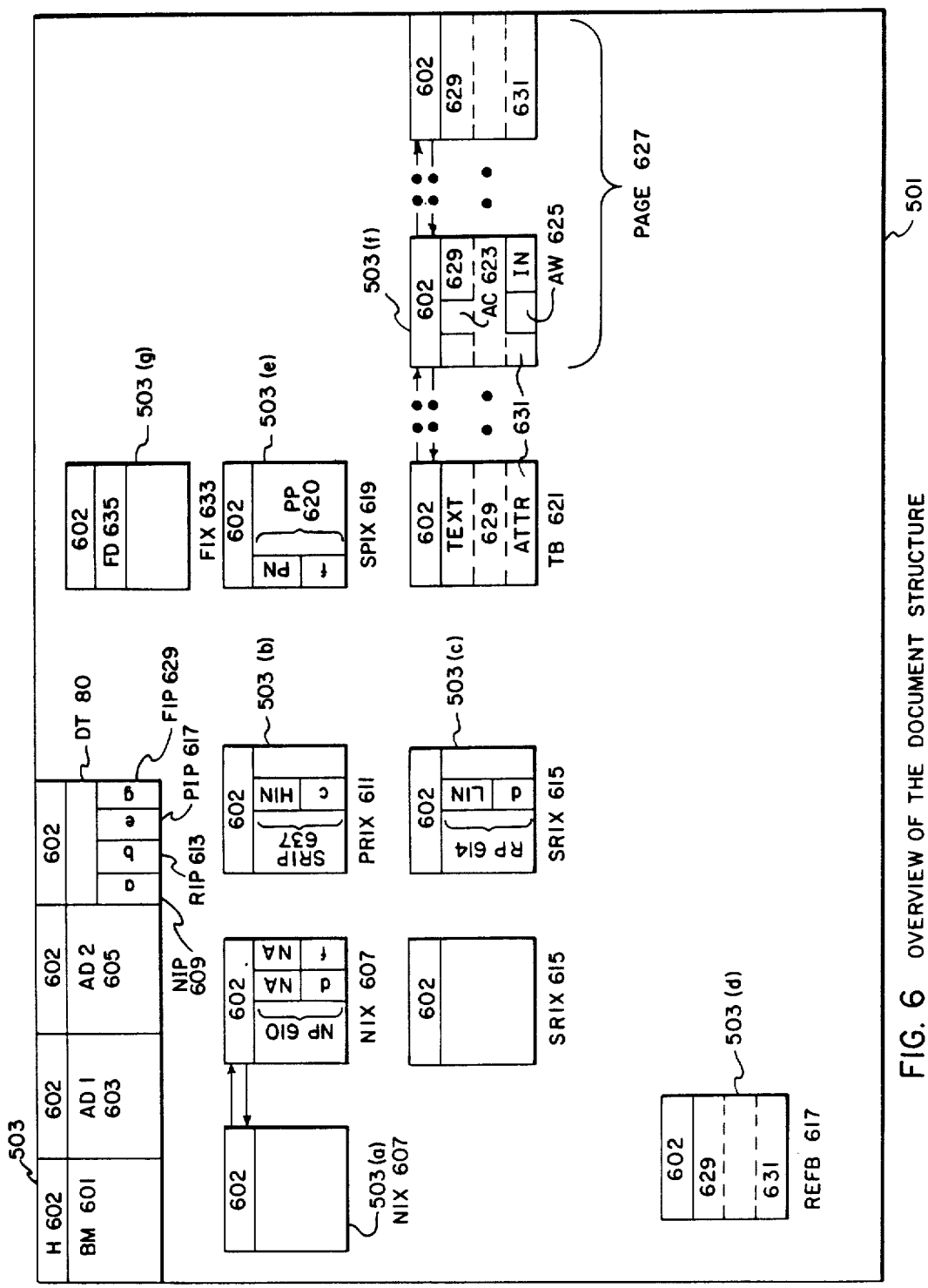
FIG. 6 OVERVIEW OF THE DOCUMENT STRUCTURE

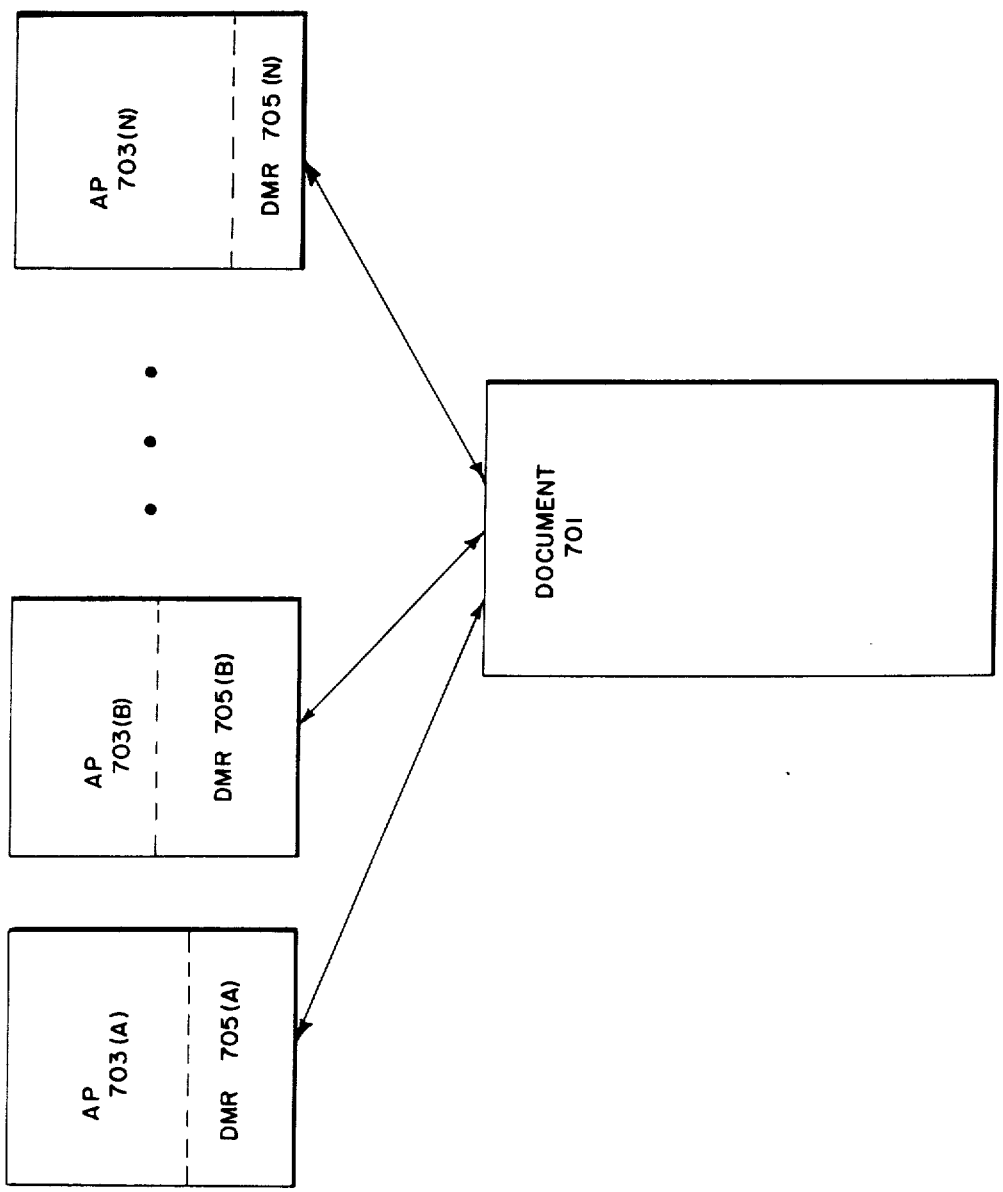
FIG. 7 DOCUMENT MANIPULATION IN PRIOR-ART SYSTEMS

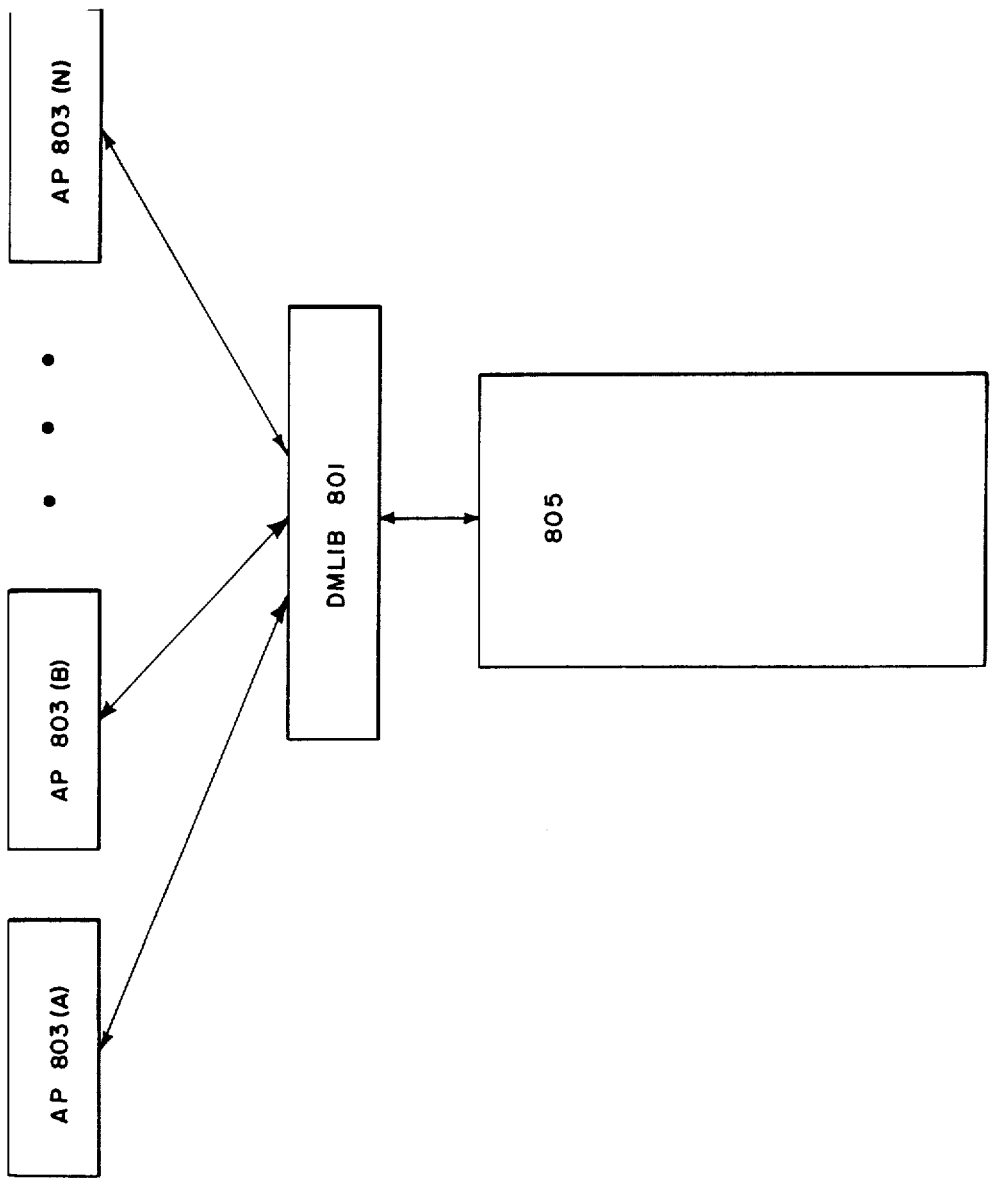
FIG. 8 DOCUMENT MANIPULATION IN THE PRESENT INVENTION

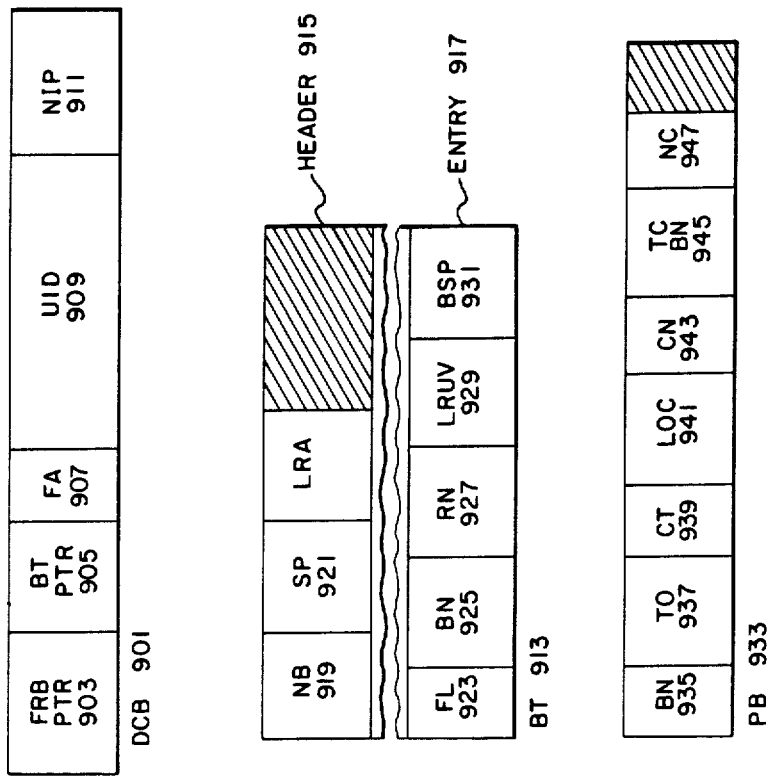
FIG. 9 DATA STRUCTURES USED IN THE DOCUMENT PROCESSING SYSTEM

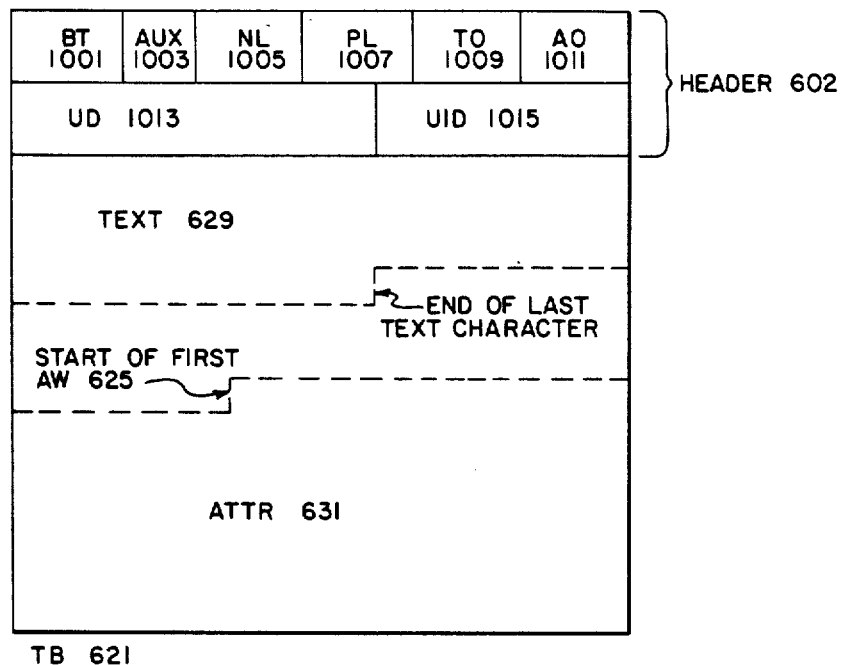
FIG. 10  TB 621 DETAIL

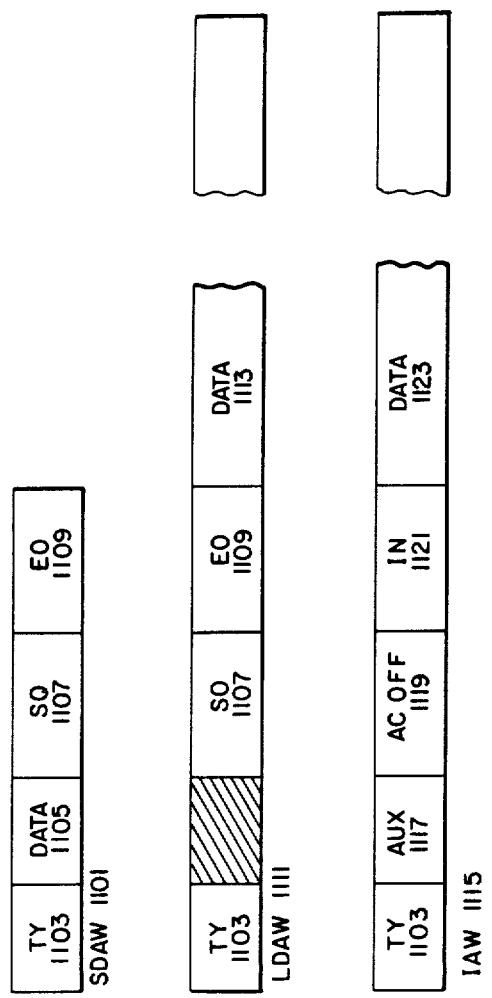
FIG. 11 DETAIL OF ATTRIBUTE WORDS 625

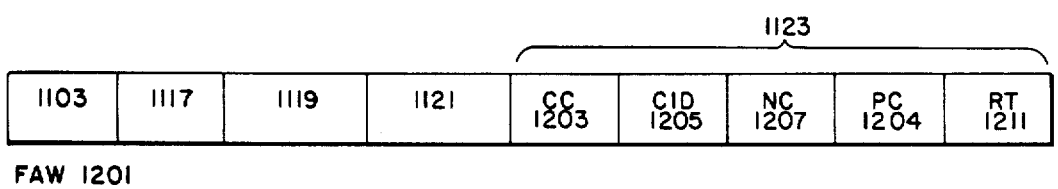
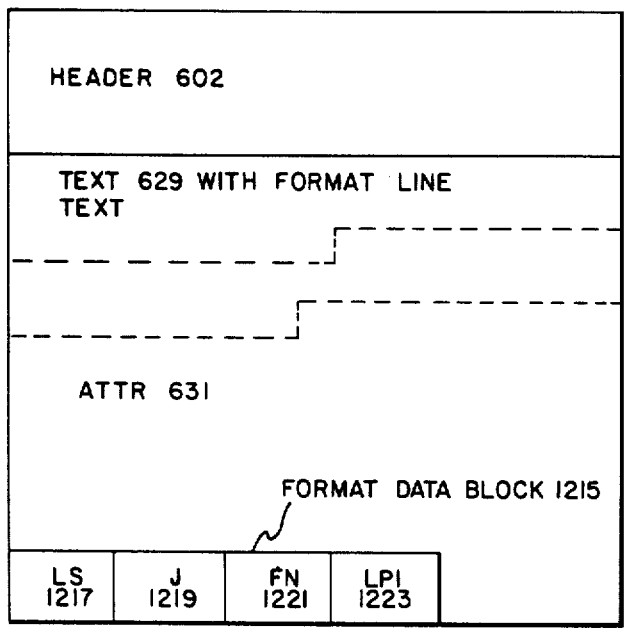
FIG. 12 FORMAT ATTRIBUTE WORD AND FORMAT REFERENCE BLOCKS

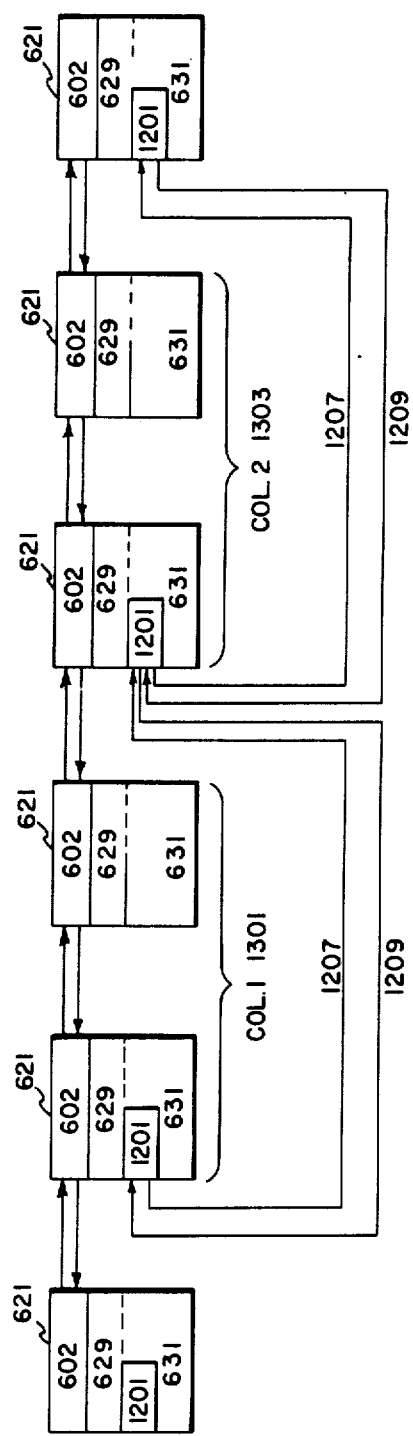
FIG. 13 COLUMNS IN A CHAIN OF TBS 621

STRUCTURES AND METHODS FOR REPRESENTING AND PROCESSING DOCUMENTS

CROSS REFERENCES TO RELATED APPLICATIONS

This is a continuation of co-pending application Ser. No. 656,831 now abandoned filed on Oct. 2, 1987 which is a continuation-in-part of application Ser. No. 538,644, filed Oct. 3, 1983, titled Data Structure for a Document Processing System. Coinventors of U.S. Ser. No. 538,644 and the present application are James L. Cooper and Marc D. San Soucie.

BACKGROUND OF THE INVENTION

1. Field of the Invention

The present invention relates to a data structure for a data processing system and more particularly, to such a structure for the type of system referred to as a word processing or office automation system.

2. Description of the Prior Art

Word Processing and office systems are primarily concerned with the generation, editing and, for example, printing and filing, of documents. Such systems usually fall into two general classes, centralized and distributed.

A centralized system may include a central processor or computer and one or more attached terminals. Data, that is, documents of various types, and routines for operating upon the documents are stored in the central processor memory. Essentially all operations upon the documents are executed in the central processor, with the terminals operating as input and output devices for the central processor.

Distributed systems are based upon a network of smaller, active units, each having memory and processing capabilities. A distributed system may include a central, shared memory unit for storing routines and data and a number of independently operating terminals. Each terminal may include a memory for storing currently active segments of routines and data and a processor for operating upon the currently active segments.

Routine and data segments are transferred between the memory unit and the terminals as required by the operations of the terminals. An exemplary distributed system is shown in U.S. Pat. No. 4,145,739, issued Mar. 20, 1979 and assigned to Wang Laboratories, Inc., the assignee of the present invention.

In any system, whether previously existing or newly designed, the memory and processing capabilities of the system are usually determined and limited by economic and practical considerations. As a result of such limitations, a recurring problem in word processing and office systems is that of implementing increasingly more sophisticated and powerful document processing systems requiring increasingly greater memory and processing capabilities within currently available system limitations. The distributed system described in U.S. Pat. No. 4,145,739 was developed in response to this problem and provided a powerful word processing capability in a system having minimal memory and processing capabilities.

The problem described above may be regarded as being comprised of two related problem areas. The first is the system control structure, that is, a structure which includes and interrelates routines for controlling the operation of the system and routines for generating and manipulating documents. Because of the above described constraints, system control structures of the prior art have either required the use of a large and powerful computer or, in smaller systems, have only allowed document processing systems of limited capabilities. The problem is essentially one of implementing the power and flexibility of a large processor and memory system within a system having limited processing and memory capacity.

A related problem is, that due to the same constraints on memory and processing capability, the control and document processing systems of the prior art have been constructed in such a manner that the system cannot be easily modified. Such modifications frequently result in sever operational problems due to unexpected or unforeseen interactions between the modified and unmodified portions of the systems.

The second problem area is that of providing a document structure having the flexibility and expansion capability to allow the generation and manipulation of very complex documents within the above described constraints on memory and processing capability.

SUMMARY OF THE INVENTION

The present invention relates to a document processing system and in particular to an improved document structure for use in such a document processing system. The document structure of the present invention is made up of equal-sized numbered blocks in a document file. There are four chief classes of blocks: administrative blocks, index blocks, text blocks, and reference blocks. The text in a document is contained in a chain of text blocks. The chain of text blocks may be subdivided into pages. The text characters may have visual/descriptive attributes which determine the manner in which they appear when displayed and font attributes which specify the fonts used to display characters by font number. Locations in the text may also be associated with informational attributes which refer to information contained in chains of reference blocks by means of item numbers. Components of a document are located by means of indexes made up of the index blocks. There are four kinds of indexes: the page index, by which the text blocks at the heads of pages may be located by page number, the item index, by which references may be located by item number, the name index, by which named components of the document may be located by character string names, and the font index, by which descriptors for specific fonts may be located.

The document structure is manipulated by routines in a document manager library. The routines include routines for determining the item number or page number of a component and other routines for receiving an item number, page number, or name, and performing operations on the component so specified. All application programs which manipulate documents in the present invention use the routines in the document manager library.

It is thus an object of the present invention to provide an improved document processing system.

It is another object of the invention to provide an improved document structure for use in a document processing system.

It is an additional object of the invention to provide a document structure permitting access to its components by means of names, item numbers, and pages.

It is a further object of the invention to provide a document structure wherein a text may have descriptive/visual attributes, font attributes, and descriptive attributes.

It is still another object of the invention to provide an improved interface for manipulating the document structure.

Other objects and advantages of the present invention will be understood by those of ordinary skill in the art after referring to the detailed description of a preferred embodiment and the additional detailed description of a preferred embodiment contained herein and to the drawings, wherein:

BRIEF DESCRIPTION OF THE DRAWINGS

FIG. 5 is a diagram of the structure of a document file of the present invention.

FIG. 6 is a diagram presenting a detailed overview of the document structure of the present invention.

FIG. 7 is a block diagram of document manipulation in prior-art document processing systems.

FIG. 8 is a block diagram of document manipulation in the document processing system of the present invention.

FIG. 9 is a representation of data structures used in the document processing system.

FIG. 10 is a detailed representation of a text block of the present invention.

FIG. 11 is a detailed representation of attribute words in the present invention.

FIG. 12 is a detailed representation of the format attribute word and the format reference block of the present invention.

FIG. 13 is a detailed representation of columns in the present invention.

Reference numbers in FIGS. 5-13 have three digits, the most significant of which is the number of the figure in which the reference is first illustrated. Thus, the reference with the number 629 is first shown in FIG. 6. Reference numbers for FIGS. 1-5 have only 2 digits and are not related to the figure numbers.

DESCRIPTION OF A PREFERRED EMBODIMENT

The following discussion presents the structure and operation of a document processing system incorporating the present invention. The system and system control and document structures will be detailed first at a block diagram level, followed by more detailed descriptions of these structures and the document structure implemented therein.

1. System Block Diagram Structure and Operation (FIGS. 1 and 2)

Figure 1:
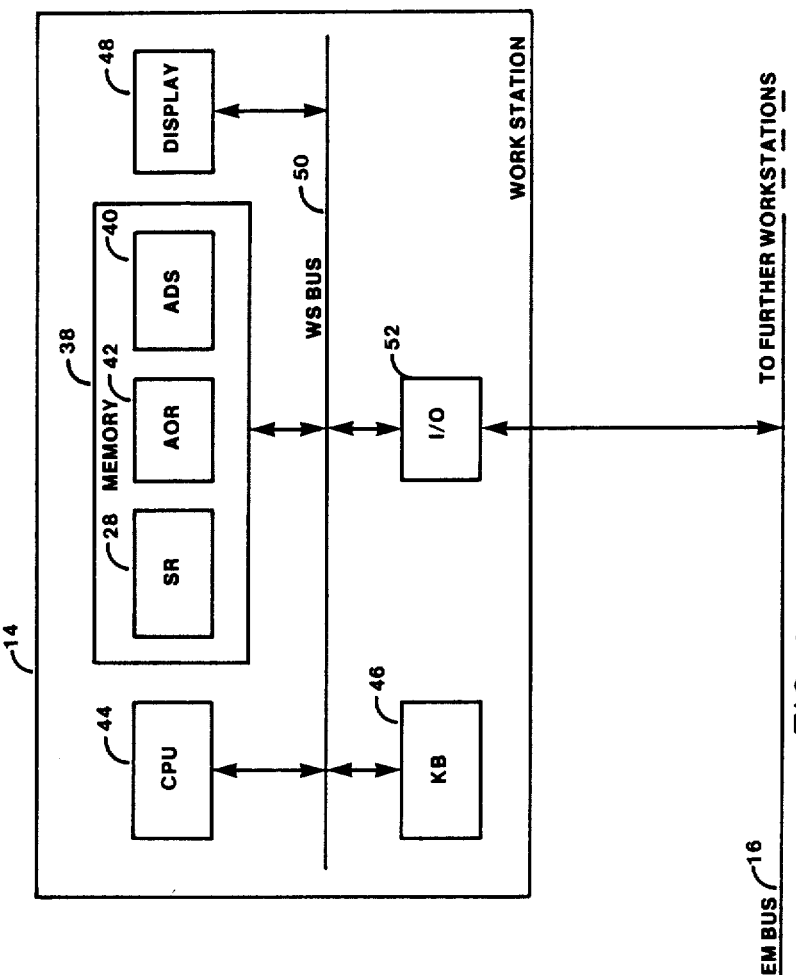
FIG. 1 is a block diagram representation of a system incorporating the present invention.
Figure 2:
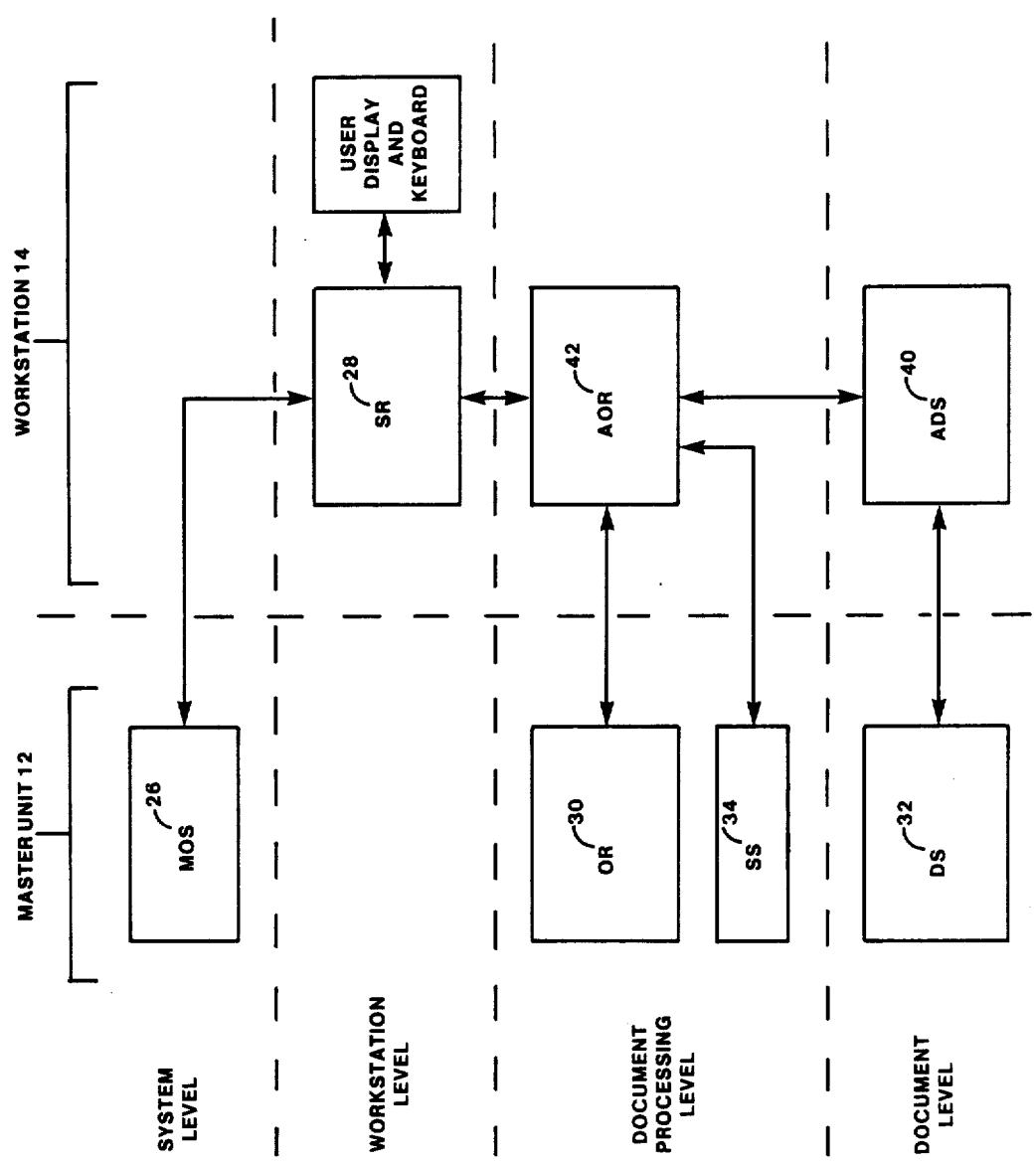
FIG. 2 is a block diagram representation of the control and document structures of the system of FIG. 1.

Referring to FIG. 1, a block diagram of a distributed System 10 incorporating the present invention is shown. System 10 is similar in structure and overall operation to the data processing system described in U.S. Pat. No. 4,145,739, previously referenced and incorporated herein by reference.

Major elements of System 10 include a Master Unit 12 and one or more Workstations 14 interconnected through System Bus 16. As will be described further below, Master Unit 12 is a system memory and stores a master copy of all routines for controlling operation of the system, including document manipulation operations executed by Workstations 14. Master Unit 12 also stores copes of all segments, active and inactive, of all documents being operated upon by Workstations 14.

Currently active segments of the documents being operated upon by Workstations 14, the document manipulation routines necessary to operate upon the active document segments and the routines necessary to control operation of Workstations 14 reside, as described below, in Workstations 14. The currently active document segments and routines residing in Workstations 14 are, as described further below, subsets of the master copies of the documents and routines residing in Master Unit 12. Document segments and workstation control and document manipulation routines are transferred between Master Unit 12 and Workstations 14 through System Bus 16 as required by the operations of Workstations 14.

A. Master Unit 12 (FIG. 1)

Master Unit 12 is, in the present embodiment, a disc drive memory including a Disc 18 and a Master Disc Controller 20. Master Disc Controller 20 is a microprocessor controlled unit operating under control of routines stored on Disc 18 for controlling transfer of information between Disc 18 and Workstations 14.

Referring to Disc 18, the information residing thereon includes a Master Copy 22 of all routines required to control all operations of System 10, including document manipulation operations, and one or more Document Files 24, which include copies of all segments, active and inactive, of all documents residing in System 10. The routines residing in Master Copy 22 include Master Operating System (MOS) 26, Supervisor Routines (SR) 28 and Overlay Routines (OR) 30. MOS 26 includes the routines controlling overall operation of System 10, for example, the operation of Disc Control 20 and the transfer of information between Master Unit 12 and Workstations 14. SR 28 includes the routines, described further below, for controlling the internal operations of Workstations 14 and essentially comprise an internal operating system for Workstations 14. OR 30, in turn, includes the document manipulation routines, that is, routines executed by Workstations 14 in directly operating upon documents.

Each Document File 24 residing on Disc 18 will include a master copy of a corresponding Document Structure (DS) 32 of a document residing in System 10. If the document currently being operated upon at Workstation 14, a copy of the currently active segments of the document's DS 32 will reside in the Workstation 14 and there will be transfers of document segments between the DS 32 and Workstation 14 as the document is operated upon. Each Document File 24 may also include one or more Saved States (SS) 34. As will be described further below, an SS 34 results when an operation being performed upon a document is interrupted to execute a different operation before the interrupted operation is completed. In such cases, the state of operation of the Workstation 14, that is, information completely defining the interrupted operation, including the interrupted routine, is saved by being copied as an SS 34 to the corresponding Document File 24.

B. Workstation 14 (FIG. 1)

As shown in FIG. 1, Workstation 14 includes Workstation Memory (WSM) 38 for storing currently active document segments (ADS) 40 of a DS 32, currently active segments (AOR) 42 of OR 30, and the workstation copy of SR 28. As described further below, ADS 38 and AOR 40 are subsets, or working copies, of portions of DS 32 and OR 30. Workstation 14 further includes Workstation Central Processor Unit (CPU) for operating upon ADS 40 under direction of AOR 40 and SR 28, a Keyboard (KB) 46 to allow a workstation user to enter data (text) and document manipulation commands, and a Display 48 for displaying the results of user and system operations. The elements of Workstation 14 are interconnected through Workstation (WS) Bus 50 and information is conducted between WS Bus 50 and the elements of Workstation 14 and System Bus 16 through Input/Output (I/O) 52.

As will be described further below, a primary visible focus of the operation of System 10 is the interactive operation between System 10 and a user, through KB 46 and Display 48, in the generation and manipulation of documents. System 10 may be regarded, therefore, and in certain aspects, as a keystroke processing system. That is, a user enters data (text) and text/document manipulation commands by means of keystrokes through KB 46. Workstation 14 responds by executing in CPU 44 the appropriate routines selected from AOR 42 and SR 28, modifies the contents of ADS 40 as determined by the executed routines, and displays the results of the user actions through Display 48.

C. System 10 Control and Document Structure (FIG. 2)

Referring to FIG. 2, a diagrammic overview of the System 10 control and document structure is shown. As has been previously described, the major elements of System 10's control and document structure include Master Operating System (MOS) 26, Service Routines (SR) 28, Overlay Routines (OR) 30 and Active Overlay Routines 42, and Document Structures (DS) 32 and Active Document Structures (ADS) 40.

The hierarchical structure of these elements is illustrated in FIG. 2, as are their locations and primary areas of operation in System 10. As will be described further below, MOS 26 primarily resides in Master Unit 12 and comprises an operating system for all of System 10 while SR 28 resides in Workstation 14 and comprises a workstation operating system. OR 30, the document manipulation routines comprises the actual document processing system, with a time varying subset of OR 30, AOR 42, residing in Workstation 14. DS 32 contains the actual document, with a time varying subset of DS 32, ADS 40, residing in Workstation 14.

a. Master Operating System 26

As previously described, MOS 26 controls the overall operation of System 10 and is a resource shared by Master Unit 12 and all Workstations 14 in System 10. MOS 26 is effectively an operating system for System 10 and primarily resides in Master Unit 12. MOS 26, for example, controls the transfer of information between Master Unit 12 and Workstations 14.

b. Service Routines 28

As indicated in FIG. 2, a copy of SR 28 resides in each Workstation 14 and essentially operates as a workstation operating system. In contrast to MOS 26, which resides in Master Unit 12, and to OR 30/AOR 42, described below. SR 28 is resident in Workstation 14 at all times while Workstation 14 is operating. SR 28 interacts directly with MOS 26, the user and AOR 42 and interacts indirectly with ADS 40, through AOR 42, and with DS 32 and OR 30 through MOS 28. SR 28 is thereby effectively the central, or nodal, element through which all elements of System 10 interact and through which all operations are accomplished.

In interacting with MOS 26, for example, SR 28 in a Workstation 14 manages the available memory space in the workstations WSM 38 and monitors the selection of routines to be executed by the workstation. If, for example, it becomes necessary to free space in WSM 38 for new active document segments in ADS 40 or if a routine is selected which does not presently reside in WSM 38, SR 28 will generate a request for an appropriate transfer of information between Workstation 14 and Master Unit 12. SR 28 will place that request in I/O 52 and the request will subsequently be read by MOS 26 in a workstation polling procedure. MOS 26 will respond to the request by performing the information transfer, that is, by transferring the necessary document segments, routines or saved state information between Disc 18 and WSM 38 of the Workstation 14. This interaction between SR 28 and MOS 26 is an example of the indirect interaction between SR 28 and OR 30 and DS 32. That is, SR 28 interacts with MOS 26 to operate upon ADS 40 and AOR 42 which, in turn, are subsets of DS 32 and OR 30.

As previously described, System 10 may be regarded, in certain aspects, as a keystroke processing system, that is, accepting text and document manipulation commands from a user through keystrokes through KB 46, performing the indicated operation upon a document, and displaying the results of the operations to the user through Display 48.

To accomplish this function. SR 28 interacts with the user through KB 46 and Display 48 and with the document through document manipulation routines OR 30/AOR 42. As described further below, SR 28 accepts keystroke inputs from KB 46, selects the appropriate OR 30/AOR 42 or SR 28 routine to be executed and initiates the execution of the selected routine by CPU 44. At the conclusion of execution of the selected routine, SR 28 indicates the results of the selected operation to the user through Display 48 by displaying a message or the portion of the document currently being operated upon as modified by the operation. For example, if the user is entering text, SR 28 will accept the alphanumeric keystrokes, select the AOR 40 routines to enter the alphanumeric characters in ADS 40, and update Display 48 to display the text as the characters are entered.

Overlay Routines 30

As described above, OR 30 includes all document manipulation routines and thereby effectively comprises the document processing system. MOS 26 and SR 28 in turn comprise the operating systems supporting the document processing system implemented in OR 30.

In the presently preferred embodiment of the document processing system, the document structure, described further below, may be accessed and manipulated only through OR 30. In this regard, it should be noted that while MOS 26 and SR 28 may perform certain operations with regard to DS 32/ADS 40, these operations due not include actual manipulation of or access to the document structure. OR 30 thereby defines the interface between the document structure and other elements of System 10 and effectively completely separates the features of the document structure from the remainder of the system. Because of this, the document structure or the system, for example MOS 26 or SR 28 or the actual physical structure of System 10, can be freely modified or changed with minimum effect upon other portions of the system. The document structure may, for example, be transported to or implemented in a centralized system, rather than the distributed system shown in System 10, without change. Alternately, if the document structure is modified, only OR 30 need be correspondingly modified and the remainder of System 10, for example, MOS 26 and SR 28, are undisturbed.

A further feature of OR 30 resides in the method by which the interface and access between OR 30 and the document structures, that is, the manner in which the document processing system is allowed to manipulate the document structure, is controlled and defined. This control is particularly significant when an existing system is being modified, for example, to add new features or to improve existing features. In a document or word processing system of the prior art, a designer or modifier of a document processing system directly determined and defined the means and manner by and in which the system accessed and manipulated the document structure. As a result, there were effectively no positive constraints upon how the system modifier manipulated the document structure and there were frequent and severe problems with a modified system.

In the presently preferred embodiment of the present document processing system, OR 30 is comprised of routines selected from a fixed library of routines referred to as the Document Management Library (DMLIB). The DMLIB routines are the only routines allowed to access or manipulate the document structure and effectively comprise a set of building blocks from which a document processing system can be constructed.

The DMLIB includes routines for all possible basic manipulations of the document structure and may be expanded as new manners of manipulating the document structure become desirable. To create a new document processing system or to modify an existing system, therefore, the designer determines the operations to be performed or how the existing operations are to be modified and selects and assembles, or links, the appropriate routines from the DMLIB. By doing so, the designer is assured that the operations of the new or modified system will not conflict with the document structure.

Finally, and as previously described, AOR 42, which resides in WSM 38, is a subset of the OR 30 routines and is comprised of the OR 30 routines currently being used to operate upon a document. AOR 42 and OR 30 thereby differ from SR 28 in that AOR 42 does not comprise a complete, resident copy of OR 30 but varies with time, depending upon which operations are being performed. It is for this reason that the document manipulation routines are referred to as 'overlay' routines, that is, routines are selected and overlayed into AOR 42 in WSM 38 as required. A related group of OR 30 routines which are overlayed into AOR 42 as a group are referred to as an 'overlay'.

d. Document Structure 32

As previously described, a Document File 24 contains a complete, or nearly complete, copy of a document residing in System 10. This master copy of the document is contained in Document Structure (DS) 32, which resides in Disc 18. Those portions of the document being operated upon are copied into and reside in WSM 38 in Active Document Structure (ADS) 40 and remain therein while being operated upon. As new portions of a document are operated upon, the previously resident portions of the document are copied back into Disc 18. Similarly, those portions of a document which are being newly created, that is, by being entered by a user, first reside in ADS 40 and are subsequently copied onto Disc 18. DS 30 and ADS 40 are thereby analogous to OR 30 and AOR 42 in that ADS 40 is a time varying subset of DS 30, the contents of which vary as different portions of a document are operated upon.

Transfers of portions of documents between Workstation 14 and Master Unit 12 are executed on the basis of 512 byte blocks, corresponding to the capacities of data entry and transfer buffers, described below, residing in Workstation 14 and to the capacity of a double sector of Disc 18. It should be noted that all transfers between Master Unit 12 and a Workstation 14, including transfers of document manipulation routines, are performed on this basis.

Having described the overall structure and operation of System 10, certain portions of the control and document structure described above will be described in further detail below.

2. Control and Document Structure (FIGS. 3 and 4)

Figure 3:
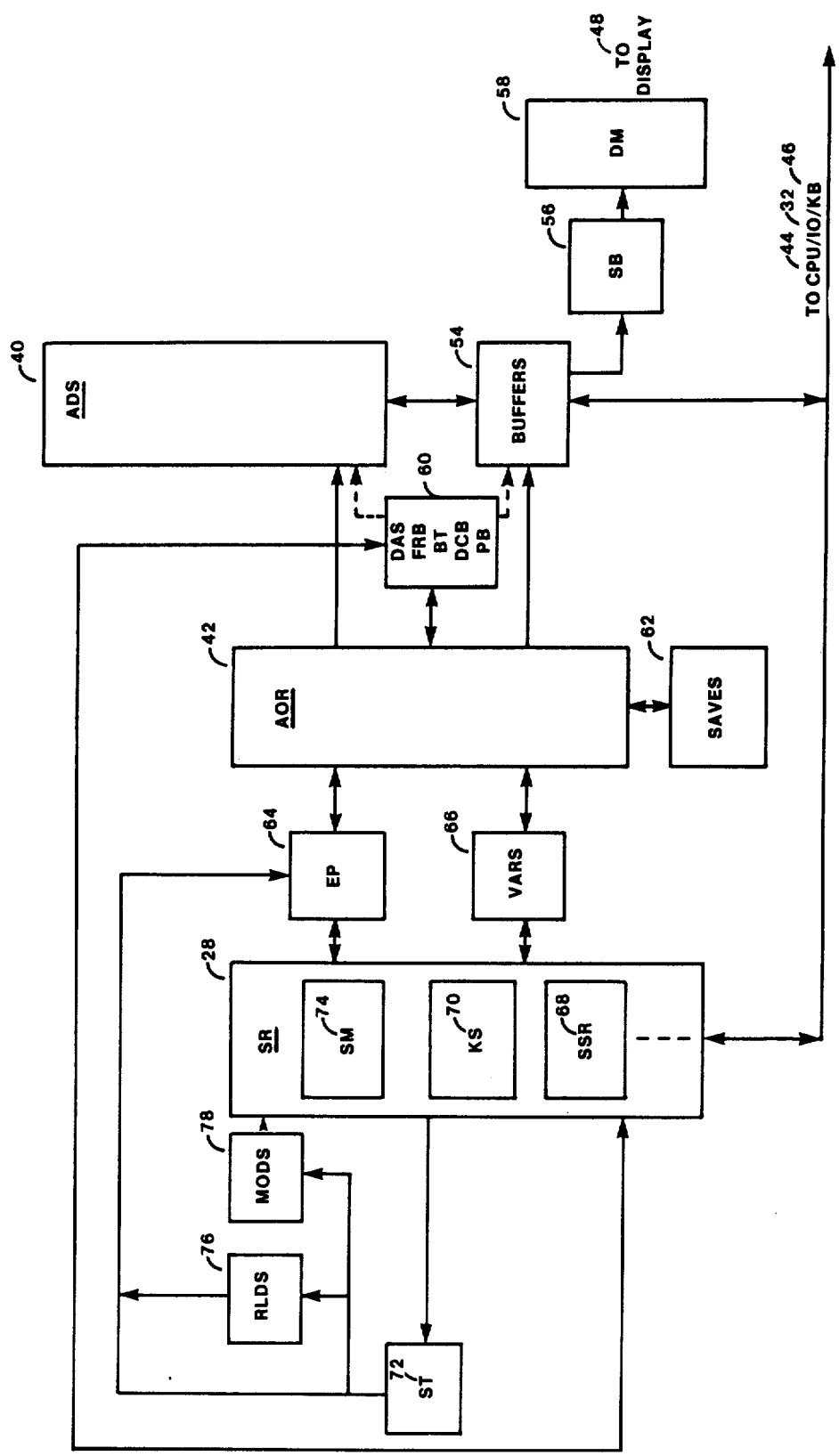
FIG. 3 is a block diagram representation of the work control and document structure of the system of FIG. 1.
Figure 4:
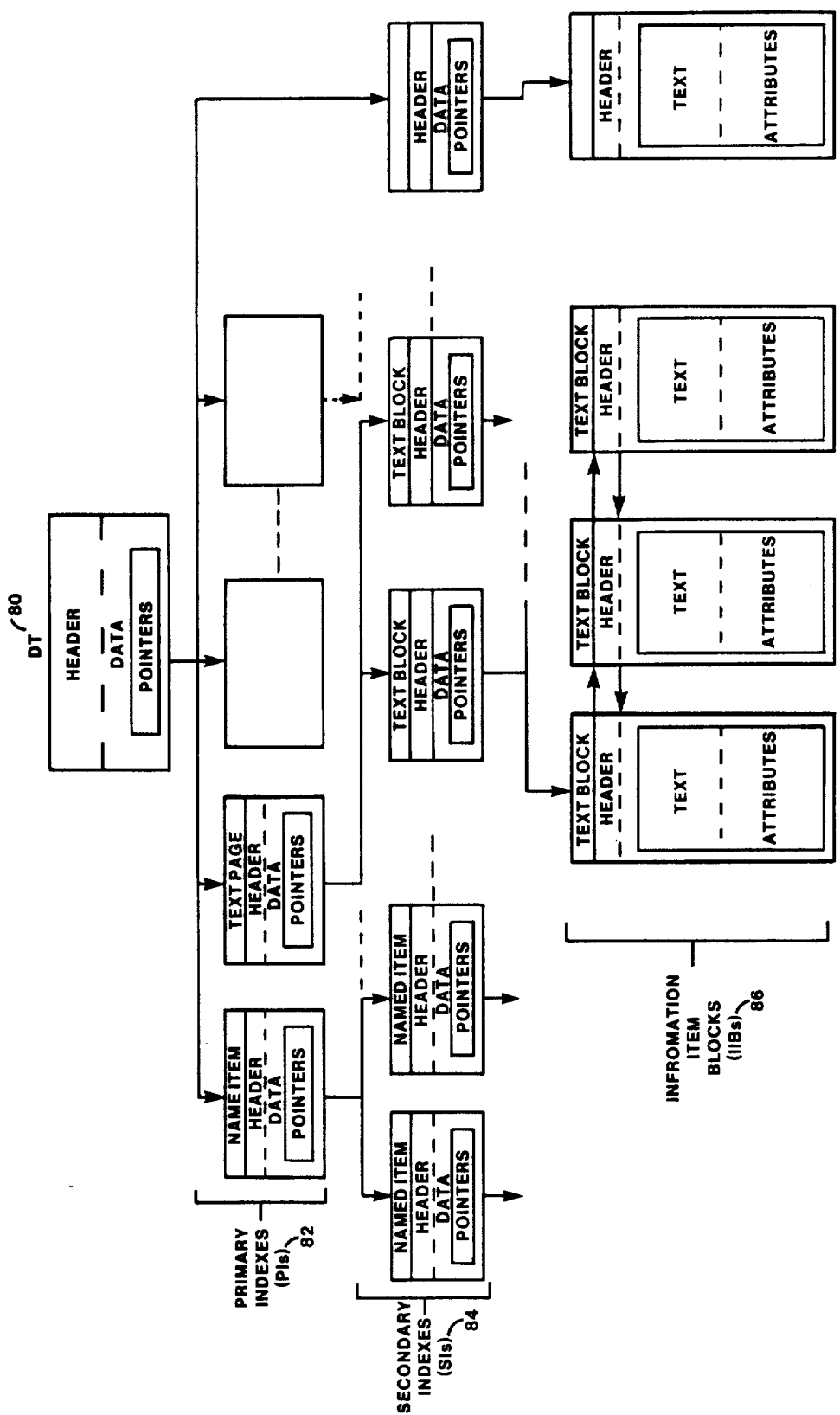
FIG. 4 is a diagrammic representation of the document structure of the present invention.

Referring to FIG. 3, a block diagram of the control and document structures residing in Workstation 14, and in particular in WSM 38, is shown. As previously described, the Workstation 14 control and document structures include SR 28 and AOR 42 and ADS 40. Also shown are other structures associated with and operating with or as part of SR 28, AOR 42 and ADS 40. The relationship and operation of the structures shown in FIG. 3 will be described first, followed by a description of the document structure of the present invention.

The physical structure and operation of Workstation 14 should be noted during the following descriptions. That is, that SR 28 and AOR 42 are comprised of routines, that is, sequences of instructions, which are read from WSM 38 to CPU 44 to direct and control the operation of CPU 44 and other elements of Workstation 14. CPU 44 in turn responds to instructions provided from SR 28 and AOR 42 to read data, for example, document text from ADS 40, operate upon the data as directed by the instructions, and, for example, transfer the results of the operations into ADS 40.

A. Block Diagram Description (FIG. 3)

As previously described, the major elements of the structures shown in FIG. 3 include ADS 40, the document segments currently being operated upon, AOR 42, the document manipulation routines currently being utilized, and SR 28, the workstation operating system.

a. ADS 40 and Associated Structures

Considering first the document structures and primary data transfer paths shown in FIG. 3, as described above ADS 40 is a time varying subset of DS 32 and comprises those portions of the document currently being operated upon. As differing portions of the document are operated upon, document segments are transferred between ADS 40 and DS 32. For example, if the already existing text of a document is to be modified, such as by the addition of deletion of text, the portions of the document to changed are read from Disc 18 and into ADS 40. The changes are entered through KB 46 by the user and, after the changes are accomplished, the changed portions of the document will be subsequently read back into DS 32 to provide space in ADS 40 for further segments of the document. In further example, when portions of a document are being newly created, the text information is entered through KB 46 by the user, assembled into the document in ADS 40, and subsequently read into DS 32 as the available space in ADS 40 is filled.

1. Buffers 54

Two further structures are directly associated with ADS 40. The first is Buffers 54, which are a set of general purpose buffers created by SR 28 and primarily used for input/output operations to and from ADS 40. Buffers 54, for example, are used in the transfer of document segments between Disc 18 and ADS 40 and in the entry of text from KB 46 to ADS 40.

In the presently preferred embodiment, Buffers 54 contains between three and ten buffers, each of which has a capacity of 512 bytes. The capacity of Buffers 54 is, as described above, based on the capacity of a double sector of Disc 18 and the size of the blocks transferred between Master Unit 12 and Workstation 14.

2. Screen Buffer 56 and Display Memory 58

Associated with Buffers 54 are Screen Buffer (SB) 56 and Display Memory (DM) 58. DM 58 contains, at any time, the information which is currently being displayed on Display 48 while SB 56 is a buffer through which information to be displayed is written into DM 56. As will be described below, DM 58 is the source for information being displayed by Display 48 and is thereby being frequently read by Display 48. The function of SB 56 is to hold information to be displayed until a time is available to write information into DM 58 and, by doing so, frees Buffers 54 for other operations.

The information displayed by Display 48 may include visual representations of portions of a document being operated upon, that is, a portion or all of the contents of ADS 40 and, for example, messages from System 10 to the user to aid or guide the user in operation of System 10. Examples of the latter may include menues through which the user may select operations to be performed, examples of which are well known through Wang Laboratories, Inc. Office Information Systems (OIS).

As indicated in FIG. 3, information to be displayed is written into SB 56 through Buffers 54 and may be entered either a single character at a time or in blocks of information up to the capacity of a Buffer 54 or SB 56. Single character entries are used, for example, when a user is entering alphanumeric characters into a text, that is, a single character at a time through KB 48. In this case, the individual characters are entered into one of Buffers 54 and concurrently transferred, again a character at a time, into ADS 40 and SB 56. Block entries may be used, for example, when a user is moving from one section or page of a document to another, necessitating the display of entirely new screens of information by Display 48.

Information entered into SB 56 is subsequently transferred into DM 58, which contains one or more display screens of the information actually being displayed by Display 48. Display 48 in turn reads the information for the currently displayed screen from DM 58 and presents this information to the user in visual form.

It should be noted at this point that the form in which information is stored in DM 58 is dependent upon the capabilities of Display 48. There are two primary forms of display, character generated and bit mapped. In a character generated display, the information to be displayed is stored in the form of codes representing the characters or symbols to be displayed. The display reads these codes and, through a character generator, converts the codes into patterns of illuminated dots forming the characters on the display CRT. In a bit mapped display, the actual patterns of the dots forming the displayed characters or symbols are stored, rather than codes, and the stored information is displayed directly. A bit mapped display is advantageous in that complex graphics displays, such as pictorial images, are more easily generated, but are more expensive in that they require substantially greater memory capacity for storing the display information.

As will be described below, the document structure of the present invention will support bit mapped images as elements of a document; this capability is not available, however, in a character generator display. An alternate form of graphics display, referred to as character set graphics, may be provided by the present document processing system. Character set graphics are based upon the manner in which characters and symbols are generated upon a CRT screen, that is, as rectangular matrices of dots, for example, 5 by 7 dots. The individual characters are then generated by illuminating certain dots of the matrix while leaving the remaining dots dark. In a character set graphics display, provision is made to generate a wide range of symbols, or patterns of dots, and a code assigned to each symbol. These graphic symbols, or dot patterns, are then assembled in arrays on the screen to generate the desired graphics image.

3. Document Access Structure 60

The second structure directly associated with ADS 40 is Document Access Structure (DAS) 60, which contains information locating and interrelating various areas in ADS 40 and Buffers 54 and the information residing therein. DAS 60 is used by AOR 42 routines, and in part by SR 28 routines, to locate and operate upon items of information in ADS 40 and Buffers 54. DAS 60 is thereby the principle interface between the document structures, that is, ADS 40, and the document manipulation routines, that is, AOR 42. DAS 60, by providing information relating ADS 40 and Buffers 54, the input/output path for ADS 40, thereby also comprises the principle link, or access path, between ADS 40 and the remainder of System 10, including DS 32.

DAS 60 is originally generated by SR 28 and contains four major elements, a File Reference Block (FRB), a Buffer Table (BT), a Document Control Block (DCB) and a set of one or more Position Blocks (PBs).

The FRB primarily contains information used for document communication between Workstation 14 and Master Unit 12. Examples of this information include a Reference Number identifying the particular document during the period in which the document is being operated upon and a Reference Control Block. The Reference Control Block n turn contains information indicating whether an I/O request has been generated by the workstation, as described above, and whether errors have been detected. The Control Block also contains information generated by the workstation indicating whether a document file is to be created for a new document and whether a document is to be transferred in its entirety to its DS 32, that is, 'clean-up' at the end of operation on the document.

The BT is generated by OR 30 and is used by OR 28 to maintain and operate Buffers 54. The BT is primarily comprised of a set of pointers and information indicating the locations and capacities of the buffers of Buffer 54 in WSM 38.

The DCB contains information identifying the document currently being operated upon and the current status of that document. The DCB also contains information through which OR 30 may locate the FRB and BT.

The PBs contain information denoting specific positions within the document being operated upon. Almost all forms of access to the document are performed through a PB and a PB may be initialized by most routines requiring access to the document. For example, an AOR 42 routine to move a portion of text from one location within the document to another location will initialize a PB pointing to the initial and destination locations of the text to be moved. The move routine will then use this information in moving the text.

b. AOR 42 and Associated Structures

As previously described, OR 30 includes all actual document manipulation routines and thereby comprises the actual document processing system. AOR 42 is a time varying subset of OR 30 and is comprised of the OR 30 routines currently being used to operate upon a document. Reordered groups of OR 30 routines, referred to as 'overlays' are read from OR 30 and overlayed into AOR 42 as required for the selected document operations. The routines in AOR 42 access and operate upon ADS 40 and Buffers 54, using information contained in DAS 60, which is also accessed and operated upon by AOR 42.

As previously described, the document processing system has the capability of 'nesting', or 'stacking' document manipulation routines. For example, if the user is executing an 'insert' routine to insert text into a document, the user may, without terminating that operation, initiate a second operation, for example, an 'insert' or 'delete' operation within the text being inserted. The second, or interrupting, routine is initiated and executed without exiting the initial, or interrupted, routine, and, at the conclusion of the interrupting routine, the system returns to the initial routine. The user may 'nest' several such routines and the routines will be returned to in the reverse of the sequence in which they were initiated.

The nesting of OR 30 routines, and any necessary saving of AOR 42 routines due to overlay operations is accomplished through the operation of Save Stack (SAVES) 62 associated with AOR 42. As will be described further below, SAVES 62 is a part of the stack structure associated with and controlled by SR 28.

The saving of an AOR 42 routine is accomplished be transferring a copy of the entire routine into the corresponding DF 24, that is, into a SS 34, together with other associated information pertaining to the state of operation of the system. When this occurs, SR 28 places on SAVES 62, File Reference Serial Number (FRSN) identifying the memory image of the saved routine, that is, the location of the saved routine. When the saved routine is returned to, SR 28 reads the saved routine FRSN from SAVES 62, uses the FRSN to find and copy, or overlay, the routine from the DF 24 to AOR 42, and reinitiates execution of the routine.

b. Control Transfer and the SR 28/AOR 42 Interface

Before continuing to a description of SR 28, it is necessary to consider the structure and operation of the control structures which form the interface between SR 28 and AOR 42 and which are used to transfer control from one routine to another, either within SR 28 or AOR 42 or between SR 28 and AOR 42. The transfer of system control from one routine to another requires, first, an identification of the routine to which control is passed, and second, a means for passing information from the original routine to the routine assuming control. The elements through which these operations are accomplished and which comprise the interface between SR 28 and AOR 42 include Execution Pointer (EP) 64 and Variable Stack (VARS) 66.

1. Execution Pointer (EP) 64 and Vectors

Routines are identified, located and initiated through the use of 'vectors', which are essentially logical, as opposed to physical, addresses of the routines so identified. Each vector contains sufficient information, as described below, to identify, overlay if necessary, and execute a routine. Each vector includes three Information fields, a Type field, a Size field and a File Reference Serial Number (FRSN)/Address field.

The vector Type field contains information as to whether the corresponding routine is a Resident or Local, Overlayed, Saved or Internal routine. A Resident routine is any routine which is always resident in memory, that is, always resides in WSM 38. An example of a Resident routine is any of the SR 28 routines. A routine which is part of a given overlay, that is, a related group of OR 30 routines, is 'Local' to that overlay and to any other routine within that overlay. A Local routine thereby becomes a Resident routine for execution purposes when the overlay to which it is Local is read into AOR 42.

An Overlayed routine is any routine which must be loaded into WSM 38 from Disc 18 and includes all OR 30 routines in OR 30 overlays.

A Saved routine is any routine or overlay which must, due to its nature, be saved as described above before another overlay is loaded into AOR 42. An Internal routine is any routine or overlay has been saved, as just described. That is, a Saved routine is a routine which must be saved while an Internal routine is a routine which has been saved.

The vector Size field is used with reference to overlays and indicates the size, or number of 256 byte sectors in the overlay. The contents of a vector FRSN/Address field depends upon the Type of the routine. In the case of a Resident routine, the FRSN/Address field contains the address of the starting point of the routine. In the case of an overlay, the FRSN/Address field contains the FRSN of the routine, that is, a logical address used to identify and locate the routine and to load the routine into AOR 42. The starting address of an overlay routine is assumed to be the first location in the overlay area of WSM 38, that is, the first location in AOR 42; this location contains the start of a routine leading to the selected routine.

Control is passed from one routine to another by means of vectors loaded into EP 64 from either AOR 42, SR 28 or Reload Stack (RLDS) 68, which is associated with SR 28 and described further below. Each time a currently controlling routine is to pass control to another routine, the controlling routine loads into EP 64 the vector of the routine to which control is to be passed. SR 28 includes routines which monitor the contents of EP 64 and, when a vector is detected therein, executes a routine, using the vector, to locate and initiate execution of the new routine.

The operation performed by SR 28 in passing control to a new routine depends upon the Type of the routine, as determined by the vector Type field. If the routine is Resident or Local to an overlay currently residing in AOR 42, the vector FRSN field is used as a pointer, or address, to the start of the new routine and control is transferred to the new routine at that point.

If the vector Type Field indicates that the new routine is an Overlayed routine, the vector FRSN/Address field contains the FRSN of the routine. In this case, SR 28 initiates a routine, utilizing the new routines' FRSN, to read the overlay containing the new routine from Disc 18 and into AOR 42. When the overlay operation is completed, SR 28 transfers control to the first location in AOR 28 which, as described above, is the start of a routine leading to the entry point of the new routine.

If the vector Type field indicates that the new routine has been saved or stacked, as described below. SR 28 will, if it resides in SR 28 or currently resides in AOR 42, execute a routine to reinitiate the routine. If the routine resides in a SS 34, SR 28 will execute a routine to reload the routine from SS 34 before reinitiating.

2. Variables Stack 66 and Passing of Information

As described above, the passing of control from one routine to another requires a means for passing information from the controlling routine to the routine to which control is to pass and, in particular, from the passing routine to SR 28, the workstation operating system. This function is performed through Variable Stack (VARS) 66, which receives such information from and provides such information to the SR 28 and AOR 42 routines.

As will be described further below with regard to SR 28, the workstation operating system operates is a state machine, that is, the response to any given input or condition will depend upon the station in which the system is operating. Accordingly, the information written into VARS 66 includes, as described further below, an identification of the system state in which routines are to be executed and space is reserved on VARS 66 and a variables entry made each time a new system state is entered.

Having described the interface between SR 28 and AOR 42 and the means by which control is passed between routines, the operation of SR 28 and its associates structures will be described next below.

c. SR 28 and Associated Structures

As described above, SR 28 comprises a state machine operating system for Workstation 14, that is, the response of the system to any particular input or condition is, as determined by SR 28, dependent upon the particular current operating 'state' of the system. In addition to controlling the overall operation of Workstation 14 and supporting the operation of the document processing system implemented in OR 28/AOR 42, SR 28 accepts and processes user keystroke inputs and provides a stack mechanism for the stacking, or nesting, of operations.

1. Slave and Service Routines 68

As indicated in FIG. 3, SR 28 includes Slave and Service Routines (SSR) 68 for directing, for example, operations between Workstation 14 and MOS 26, such as generating and handling requests for information transfers between Workstation 14 and Disc 18. The general operation of SSR 68 is described in U.S. Pat. No. 4,145,739, previously incorporated herein by reference.

2. Keystroke Processing and System State

As described above, a primary visible focus of the operation of System 10 is the interactive operation between System 10 and a user through KB 46 and Display 48 in the generation and manipulation of documents. System 10 may be regarded in certain aspects, therefore, as a keystroke processing system. That is, a user enters data (text) and text/document manipulation commands by means of keystrokes through KB 46 and the system responds by executing the appropriate routines selected from AOR 42 and SR 28 to correspondingly modify the contents of ADS 40. SR 28's keystroke processing mechanism, which includes Keystroke Routines (KS) 70, is thereby the principle input interface between the user and the system.

The response of the system to particular keystroke inputs is, as previously described, dependent upon the particular state of operation of the system, that is, upon what operations the system is currently executing. SR 28 thereby incorporates a state machine mechanism, including State Table (ST) 72, which interacts with SR 28's keystroke processing mechanism to determine the appropriate response to user keystroke inputs.

The response of the keystroke processing mechanism to particular keystrokes is further determined in ST 72 by the class of the particular keystroke, wherein a class is a group of keystrokes having similar functions. The following keystroke classes are implemented in the presently preferred embodiment of the present invention:

| | | |
|---|---|---|
| GRAPHIC | DELETE | COLUMN |
| CURSOR | REPLACE | SAVE |
| SCREEN | VISUAL | RECALL |
| PAGE | INFORMATIONAL | HELP |
| GOTO PAGE | FORMAT | SUPER SEARCH |
| INSERT | MARK | SUPER COPY |
| SEARCH | COMMAND | SUPER REPLACE |
| COPY | GLOSSARY | SUPER COMMAND |
| MOVE | PRINT | DEFAULT |
| EXECUTE | NAME | VIEW |
| CANCEL | | |

ST 72, as described above, contains information relating machine state and keystroke class to corresponding routine vectors and is arranged as a set of rows wherein each row contains, in order by keystroke class, the vectors for each keystroke class for a particular state. ST 72 may thereby be indexed by state, to select a corresponding state row of vectors, and by keystroke class, to select a vector for that keystroke class in that state.

Considering now the operation of the keystroke processing and state machine, KS 70 receives information regarding keystroke inputs from KB 46 through CPU 44. This information identifies both keystroke class and the specific keystroke within the class. As previously described, information regarding current machine state resides in VARS 66. The keystroke class, keystroke and state information is provided, as indicated in FIG. 3, to the keystroke handling routines of KS 70. The keystroke handling routines in turn generate a corresponding input to ST 72 to index the state tables by state and keystroke class. ST 72 responds by providing as an output a vector identifying the appropriate SR 28 or OR 30/OAR 42 routine for the keystroke and machine state. As previously described, the vector output of ST 72 is loaded into EP 64 and the appropriate action, depending upon routine Type, is initiated by SR 28. As also indicated in FIG. 3, and as described further below, ST 72 concurrently provides the resulting vector as inputs to SR 28's stack mechanism.

3. Stack Mechanism

As previously described, SR 28 provides a stack mechanism performing three primary functions, which are identifying which overlay should currently reside in OAR 42, identifying which routine is currently being executed, and storing the memory image of saved overlays. The saving of overlays, that is, OAR 42 routines, by SAVES 62, which is a part of the ST 28 stack mechanism, has been previously described with reference to the operation of AOR 42.

The remaining stack mechanism functions are performed by Reload Stack (RLDS) 76, previously mentioned, and Module Stack (MODS) 78 which as indicated in FIG. 3 and previously described, receive inputs from the vector output of ST 72.

RLDS 76 receives and stores vectors from ST 72 and the top of RLDS 76 always contains the vector of the overlay which should currently be in OAR 42. RLDS 76 allows the vectors of interrupted routines to be saved so that interrupted routines may be returned to at the completion of execution of the interrupting routines. In this respect, RLDS 76 is the primary means of saving routines when it is not necessary to save the actual routine, for example, by stacking the vector of an interrupted overlay routine. As previously described, SAVES 62 is provided to save routines in their entirety, that is, the actual code, when necessary. As indicated in FIG. 3, RLDS 76 provides an input to EP 64 to allow the loading into EP 64 and subsequent reinitiation of interrupted routines.

MODS 78 receives and stores only the Type field of the vector of the currently executing routine. The information residing in MODS 78 is used by SR 28 in determining the appropriate handling of interrupted and returned routines and may be updated as the Type of a routine changes, for example, from overlay to resident.

SM 74 includes certain routines which are of interest in understanding the operation of SR 28's stack mechanisms; these routines include FREE, LOAD, PUSH, POP, RELOAD and ENTRY and will be described below in that order.

The primary function of FREE is to free the overlay area, that is, AOR 42, for the loading of another overlay, by setting a flag indicating that AOR 42 is to be 'reloaded' with the proper overlay. Other routines in SR 28 detect the state of this flag and initiate the appropriate operation to reload AOR 42. For example, if the information residing in the top of RLDS 76 indicates that the current overlay must be saved, SR 28 will initiate an operation to save that overlay in SAVES 62 before initiating a request to load AOR 42 with the new overlay.

LOAD is used to initiate overlay routines and is called after EP 64 is loaded with a vector to the new overlay routine. If the routine must be overlayed, that is, loaded into AOR 42, LOAD will in turn call FREE. In addition, LOAD will save, on RLDS 76, the vector of the routine calling LOAD for subsequent use by PUSH or ENTRY, described below.

The function of PUSH is to stack information concerning the last loaded overlay so that the overlay may be recovered if destroyed in some manner. PUSH first pushes the Type field of the last loaded overlay onto MODS 78. If the routine is not resident, PUSH will also push the routine's entire vector onto RLDS 76. If the routine is of the type which must be saved, PUSH will push the routine onto SAVES 62 and place the FRSN of the routine's location in SAVES 62 into the FRSN/Address field of the routine's vector on RLDS 76. In addition, PUSH will change the vector's Type field from 'saved' to 'internal' to reflect the change in Type of the routine.

The function of POP is to 'throw away' the top entry of MODS 78. If this routine is not of the resident Type, POP will also throw away the top entry of RLDS 76. If the routine is of the saved Type, POP will also delete the entry in SAVES 64. Finally, POP will reset a 'reload' flag to indicate to SR 28 that the correct overlay is not resident in AOR 42.

The function of RELOAD is to ensure that the routine specified by the top vector of RLDS 76 is currently resident in AOR 42. If the reload flag is set and the current routine, as indicated by the top entry in MODS 78, is a nonresident Type. RELOAD will load the correct overlay into AOR 42.

ENTRY operates in conjunction with LOAD to provide the entry point of the last LOADed routine.

Having described the structure and certain aspects of the operation of SR 28 and, in particular, the keystroke processing and stack mechanisms of SR 28, the fundamental operating sequence of SR 28 as a whole will be described next below.

4. Basic Operating Sequence of SR 28

The primary functions of SR 28 and the state machine implemented therein are, as described in part above, to maintain and operate the state machine, to overlay routines as required, to handle critical displays, for example, messages and menues, and to accept and process keystrokes. To perform these functions, SR 28 and the state machine repeatedly execute, in order, a sequence of four phases of operation. These phases are referred to, in the order executed, as the Overlay, Reload, Display and Keystroke phases and will be described next below in that order.

a. Overlay Phase

Overlay Phase is responsible for ensuring that the selected routine is in AOR 42, and for executing the selected routine.

This phase begins with the vector of the selected routine residing in EP 64. If the routine is resident in memory, that is, in AOR 42 or SR 28, the machine skips to execution of the routine. If the routine is not resident, that is, is an overlay routine not resident in AOR 28, SR 28 calls LOAD by loading LOAD's vector into EP 64 and the overlay is loaded into AOR 28.

With the routine resident in memory, SR 28 proceeds to execution of the routine by first calling ENTRY to determine the entry point of the routine and then executing the routine.

The Overlay Phase is usually completed at this point, that is, when the execution of the selected routine is completed. In certain cases, however, the selected routine may invoke routines residing in other overlays. In such cases, EP 64 is loaded with the vector to the invoked routine and the Overlay Phase is restarted.

Reload Phase

Reload phase is provided and initiated to ensure that the currently active routine is resident in AOR 42 in certain cases when the Overlay Phase does not perform this function.

The first such case is that of certain overlay routines which invoke other routines that, when completed, return control to the general SR 28 routines rather than to the invoking routine. The second case occurs when a routine, when completed, calls POP rather than returning to the invoking routine.

In both cases, the function of Reload Phase is to reload the correct overlay into AOR 42 and does so by calling RELOAD, described above.

c. Display Phase

SR 28 performs all critical display functions to Display 48 during this phase. Such displays include providing prompts and messages to the user, displaying menu choices available to the user, and updating the display of attributes, described further below.

d. Keystroke Phase

During this phase, SR 28 performs the keystroke processing operations previously described. That is, SR 28 receives a keystroke from KB 46 and state information from VARS 66, indexes ST 72 for the class of keystroke and current state to obtain the correct vector for the selected routine, and loads the vector into EP 64.

At this point, the machine has returned to the initial condition of the Overlay Phase and the four phases are repeated in the order and as described above.

Having described the control structure of the present system, the document structure of the present invention will be described next below.

B. Document Structure (FIG. 4)

The document structure of the present invention, that is, DS 32, is, as previously described, designed for efficient use of memory capacity while providing the flexibility required to generate very complex documents and to support advanced editing features. The primary function of the document structure is the storage and ready access of sequential text, organized into logical user specified pages of arbitrary length. The structure allows fast and efficient character and page editing and allows for the application of a large number of visual attributes, or enhancements, to the characters of a text. Certain of these editing features include visual attributes, such as underlining, bold type and various fonts, and information attributes, such as notes, footnotes and voice. The document structure also allows the application of character related information which is not primary visual in nature, such as optionally printed text, table of content and index generation, and temporary markers used for editing aids. Additional features allow the user to assign names to various portions of a document and to access and operate upon named portions through those names.

The basic element of a document is a fixed size block of information, the size of which is determined by a convenient and efficiently sized unit of memory space in which the document is created and operated upon. In the present embodiment in System 10, the block size is determined to be two Disc 18 sectors, that is, 512 bytes. In another system, for example, a centralized system based upon a general purpose computer, the block size may be determined by the size of the data blocks transferred between the computer main memory and a cache memory, or a multiple thereof.

As will be described below, a document structure is constructed of several different types of blocks, each having a unique internal structure and serving different, specific purposes and assembled as required to create a document. Of these blocks, certain blocks are required in any document while others are used as required. Certain blocks are always located at fixed points in the document and others are located through the pointers which form an integral part of the document structure. In addition, certain blocks, for example, blocks containing text, may be chained together as required. The document structure is thereby flexible and expandable, occupying no more memory capacity than is required for particular document but capable of accommodating very large and complex documents, and provides fast and easy access to any part of a document.

1. Basic Block Structure

All blocks in the present document structure have a fixed internal structure comprised of a Header area and a Data area. The Header area in turn has a standard, fixed structure while the structure of the Data area depends upon the block type.

The Header area includes a Block Type field identifying the block type, Forward and Backward Pointer fields used to chain together blocks of the same type, and Top and Bottom Offset fields identifying the location of the block data within the Data area. Other Header fields include a Number Of Items field used in data compression and recovery operations, a Document ID field used to identify the document to which the block belongs, and certain Checksum information for error detection. Not all blocks require the use of all of the fields defined within the standard block Header area; in such cases the unused fields are undefined and are not used but are not deleted from the Header area.

2. Basic Block Types

As described above, each document s comprised of a combination or assembly of various types of blocks, which can be divided into three major functional categories. Management Blocks, Indexing Blocks and Text/Data Storage blocks, referred to as Information Item Blocks. Certain blocks are required in any document while other blocks may appear only in complex documents and the document structure allows the addition of further block types as required.

Management blocks are required in any document and contain printing and statistical information and user defined editing parameters for the document. Presently defined Management Blocks include an Administrative/System Block, a Style Block and a Free Block Bit Map Block.

Indexing Blocks are used to locate the various Information Item Blocks which contain the actual text and information of the document. Presently defined Indexing Blocks include a Document Table, a Named Item Index, and Primary and Secondary Indexes. The Document Table is located at a fixed point in the document and is used to locate the Named Item Index and the Primary Indexes. The Primary Indexes are used in turn to locate the Secondary Indexes and the Secondary Indexes are used to locate Information Item Blocks. Certain Information Item Blocks, and the Named Item Indexes, may be chained together through the Forward and Backward Pointers contained in their Header areas, thus providing yet another level of linking of blocks.

It should be noted that when a document does not contain more Information Item Blocks of a given type than can be identified within the capacity of a single Secondary Index, the Primary Indexes for that block type are not created and the Document Table entry for that type points directly to the single Secondary Index for that block type.

Finally, the Information Item Blocks contain, as described above and described in detail below, every type of information appearing in a document. Most Information Item Blocks having text can have that text enhanced by visual attributes, such as color and font, and can contain references to information attributes, such as format lines and footnotes.

The presently defined types of Information Item Blocks, each of which will be described in further detail below, include:

| Text | Formats |
|---|---|
| Headers/Footers | Pictures |
| Free Form Regions | Text Shelves Footnotes |
| Notes | Equation Regions |
| Voice Messages | Merge Data |
| Data Shelves | |

Certain embodiments of the present invention may also provide Matrices Blocks and External Data Blocks, as described below.

As described above, additional Information Item Block types may be defined as required and incorporated within the doCument structure in the same manner as the types listed above.

Other types of references which may be inserted into a document include, in addition to attributes, described below, Text Insertion References and Named Marks. The document structure described below also includes, as described below, means for handling text appearing in column form.

3. Minimum Document Blocks

As described above, certain of the blocks described above are required in any document. In the present embodiment of the document structure, these blocks include, for a minimum document, the:

| Document Table | Secondary Text Index |
|---|---|
| Administrative/System Block | Text Block |
| Style Block | Secondary Format Index |
| Free Block Bit Map | Format Information Item Block |

It should be noted, with regard to the two Secondary Indexes entries listed above, that, as previously described, a minimum document may contain a single Secondary Index for a particular Information Item Block and the Secondary Index may be located directly through the corresponding Document Table entry.

Having described the major categories of block type, and briefly the types of block within each category, each of the block types will be described in further detail below.

4. Management Blocks

The Administrative/System Block contains keystroke interpretation and administrative information and may be chained to other Administrative/System Blocks for very complex documents.

The Style Block contains user definable defaults concerning, for example, document character style to be used if the user defaults, that is, does not define a different style.

The Free Block Bit Map Block contains information identifying, for each block in a document, whether a particular block is currently in use. Bit Map Blocks are used by the system to efficiently allocate and deallocate blocks, that is, memory space. Bit Map Blocks may be chained, thereby allowing a complete physical mapping of every block or, in the present embodiment, disc sector.

5. Indexing Blocks

The following descriptions of the Indexing and Information Item Blocks will refer to FIG. 4, which illustrates the document structure of the present invention and the relationships between Indexing and Information Item Blocks.

As previously described, the Indexing Blocks include the Document Table, Primary Indexes and Secondary Indexes. Referring to FIG. 4, each document contains a single Document Table (DT) 80, which contains a pointer to a Primary Index (PI) for each type of Information in Block type appearing in a particular document. Each PI 82 in turn contains pointers to one or more Secondary Indexes (SIs) 84 for that Information Item Block type and each SI 84 contains, in turn, pointers to the Information Item Blocks (IIBs) 86 of that type appearing in the document. As previously described, in those cases wherein the number of IIBs 86 of a certain type is less than the number of pointers which may be accommodated in a corresponding single SI 84, the corresponding PI 82 is not used and the DT 80 entry points directly to the SI 84 for that IIB 86 type.

It should be noted that, in the present embodiment, the pointers used in the Indexing Blocks, that is, in DT 80, PIs 82 and SIs 84 are comprised of File Reference Serial Numbers, that is, the logical as opposed to physical addresses of the elements pointed to.

As will be described further below, IIBs 86 of certain types may be chained together with other IIBs 86 of the same type through the Forward and Backward Pointers in the IIB 86 Header areas. In such cases, an SI 84 pointer to a chain of IIBs 86 may point to the first IIB 86 of the chain and the remaining IIBs 86 of the chain may be located through the Forward and Backward Pointers.

a. The Document Table

The DT 80 is always located at a fixed point in the document structure, that is, at the start of the document, and there is only one DT 80. The Header area of DT 80 is of the standard, fixed structure previously described. The Data area contains a space or location for a pointer to the PI 82 or SI 84 for each possible type of IIB 86. If a particular type of IIB 86 does not appear in a document, the DT 80 entry for that type is null entry, for example, zero.

In the present embodiment, the DT 80 Data area contains the following pointers:
Named Item Index
Primary (or Secondary) Text Index
Primary (or Secondary) Format Index
Primary (or Secondary) Note Index
Primary (or Secondary) Free Form Region Index
Primary (or Secondary) Footnote Index
Primary (or Secondary) Header Index
Primary (or Secondary) Footer Index
Primary (or Secondary) Matrix Index
Primary (or Secondary) Picture Index
Primary (or Secondary) Voice Index
Primary (or Secondary) External Data Index
Primary (or Secondary) Merge Data Index
Primary (or Secondary) Equation Region Index
Text Insertion Index
Named Marks Index Binary Indexes As previously described, there is a PI 82 for each IIB 86 type appearing in a document and the Data area of each PI 82 contains pointers to the SIs 84 for the corresponding block type. In the Header area of a PI 82, the Number Of Items field will contain the number of SIs 84 referenced from the PI 82. There will be, in the present embodiment, only one PI 84 for each block type; in other embodiments, for example, PIs 82 may be chainable within each block type.

When a document is first created there will be, as previously described, only SIs 84 and probably only two such SIs 84, one for a Text Page IIB 86 and one for a Format Line IIB 86. As the document grows in complexity, the capacity of single SIs 84 will be exceeded and further SIs 84 will be created. As a second such SI 84 is created for a particular block type, a PI 82 for that type will also be created with pointers to the SIs 84 of that type, and the DT 80 entry for that type will be changed to point to the PI 82 for that type.

c. Secondary Indexes

The general structure of SIs 84 is similar to that of LIs 82 described above. As previously described, an SI 84 is pointed to by an entry in a corresponding PI 82 and contains pointers to the IIBs 86 of that block type. There may be multiple SIs 84 for a particular block type and, if so, the Header area will contain a flag indicating this fact, SIs 84 may not, however, be chained in the present embodiment, but may be chained in other embodiments.

The SI 84 Data area contains a pointer to each IIB 80 referenced through the SI 84, and for each such pointer, information as to whether the particular information item, that is, IIB 86, is named, the number of times it is referenced, and whether it is referenced from another IIB 86.

1. Secondary Text Page Indexes

Although the structure of a SI 84 for a Text Page IIB 86 is the same as any other SI 84, such SI 84s are unique in that the index contained therein is continuous, that is, no vacant entries are allowed. This restriction provides for a special property of Text Page IIB 84s; that is, that the number of a document page, which as illustrated in FIG. 4 is comprised of one or more IIBs 84, is always the same as that of the IIB 84. For example, the entry of the 45th page in a document is always the 45th entry within the first SI 84 Text Page Index.

The Secondary Text Page Index may therefore always be used to fine the first Text Page Block of a document's page. A document page can be comprised of any number of Text Page Blocks chained together by the Forward and Backward Pointers in the Block Header areas.

2. Secondary Header and Footer Indexes

Secondary Header and Footer Indexes have the same structure as all other SI 84s except that all item numbers must be assigned on even boundaries when new Header and Footer IIB 86s are created. This restriction provides space in the indexes to allow for the generation of either primary or first and second alternate Headers and Footers.

d. Named Item Index

The Named Item Index, which appears as a PI 82 in FIG. 4, provides a parallel access path to IIBs 86 which have been assigned names by the user. That is, an IIB 86 can be located by its name as well as by its Item Number, described below, or FRSN.

The Named Item Index Data area contains an entry for each IIB 86 which has been assigned a name. Each entry includes the IIB 8s's type, name and Item Number, Text Shelves, a type of IIB 86 described below, are identified by their FRSNs rather than by their Item Numbers, Entries are maintained in ascending order by type and name, no blank entries are permitted in the index, and Named Item Indexes may be chained through their Forward and Backward Pointers.

6. Information Item Blocks

As previously described, the actual text or other information of a document is contained in Information Item Blocks (IIBs) 86 and there is a type of IIB 86 for each type of information that appears or may appear in a document.

An IIB 86 may, for example, contain test and/or attributes, text and/or attributes to be interpreted as columns or rows of columns, file names for information stored externally to the document, and any other form of information. Each IIB 86 has an associated Item Number that is used to locate the IIB 86 within the Index Blocks described above. For Information attributes, described below, the Item Number is arbitrary. For text pages, however, which have been previously described as comprised of one or more IIBs 86, the item number is implied and is the same as the page number.

In all cases, however, the Item Number leads to the first IIB 86 of an information item of arbitrary length and the blocks may be chained together through the Forward and Backward pointers residing in their Header areas.

The general structure of an IIB 86 is similar to that of the Index Blocks described above, that is, with a standard Header area and a Data area. The Data area differs, however, and may contain text or attributes or both. Text is entered from the top to the bottom of the Data area and attributes are entered from the bottom to the top. A typical Data area may therefore have text in its upper portions, attributes in its lower portion and free area between, which becomes filled as text and/or attributes are entered. Either text or attributes may occupy the entire Data area, or as much of the Data area as is not occupied by, respectively, attributes or text.

In addition to the Forward and Backward pointers and other Header elements, the Top and Bottom Offset fields of the Header are used to point. respectively, to the last valid character in the Data area and the last valid attribute in the Data area.

Having described the general structure of IIBs 86, the individual types of IIBs 86 of the present embodiment will be described next below. It should be noted that further types may be added as required and that a type described below need not appear in a particular document or implementation.

a. Text Blocks

The most common form of IIB 86 is the Text Block which contains the text of the document and the attribute information, described further below, pertaining to the text contained therein. Text Blocks contain the actual body of a document text, including all visual and descriptive attributes and all information comprising references. Text Blocks can be chained together or can exist as independent blocks with the main body of a document's text existing as a single chain of blocks, beginning with the first block of the first page of the document and ending with the last block of the last page. Document pages wherein the text occupies more than one Text Block are created, to any arbitrary length, be chaining together Text Blocks.

As described above, text occupies the Data area from top to bottom and attribute information from bottom to top. The last text character appearing in a block is always an End of Text Character to identify the end of a page. Any number of Text Blocks may be chained and a Text Block is referenced either through a Text SI 84 by Item Number or through a Secondary Named Text Index by page number or name.

b. Format Blocks

A Format Block contain data pertaining to format lines, that is, lines defining the physical layout characteristics of a text line, for example, the locations of Tabs. All documents must contain at least one format line and a format line may be referenced any number of times from an location within the document and may be named.

As described above, a format reference is used to specify data to control text display, formatting, and printing characteristics, as well as the width of a single or multiple columns. A format reference will be found at the beginning of every text page, at the start of every distinct column region, and at other arbitrary user specified locations within text pages. In addition, a format reference is required at the beginning of item chains for all notes, footnotes, headers and footers and may be found at other locations within such items.

A format reference is a 'forced-break' reference, that is, the attribute character, described below, with which the reference is associated is always the first character in the text block in which it is found. If a new format line is inserted into a Text Block, the block is split into two blocks at the point of insertion and an End Of Text Character inserted at the end of the text in the block before the inserted format line. This feature allows text to be easily inserted before format lines and page breaks.

Format references are also used to control the placement and configuration of column regions and to specify special conditions, such as the presence of soft or hard page breaks.

c. Text Shelf Blocks

Text shelves are named storage areas used during editing to same and retrieve portions of text and are not normally printed. A text shelf contains both the text and the attributes pertaining thereto and is a permanent part of the document but cannot be referenced as are other IIBs 86. A Text Shelf Block may be referenced only through the Named Item Index and no SI 84 exists for Text Shelf Blocks.

d. Note Blocks

A Note Block contains the text and any applicable attributes of notes appearing in the document and a single note may be comprised of several chained Note Blocks.

e. Free Form Region and Equation Blocks

A Free Form Region of a document may contain any non-wordwrapped text or any graphic that can be entered through KB 46 and any attributes applicable thereto. Every space in a Free Form Region is defined, that is, it does not contain any 'white space', and graphics and text may be entered at any point in the region. Examples of Free Form Regions include scientific equations and charts. Free Form Region Blocks may be chained to create as large a Free Form Region as required. An Equation Block is similar to a Free Form Region Block, or a Graphics Block, but is particularly designated to contain information in the form of equations.

f. Footnote Blocks

A Footnote Block contains the text and applicable attributes of a footnote and a single footnote may be comprised of chained Footnote Blocks.

g. Header/Footer Blocks

Headers and Footers are restricted attributes, that is, they can be placed only at the top of a page, immediately after the format line.

There are three types of Headers and Footers. A Primary Header/Footer is printed on every page of the document, a First Alternate Header/Footer is printed on every other page, and a Second Alternate is printed on the pages interleaved with the pages having First Alternate Header/Footers.

Headers and Footers contain options which may pertain to specific Headers and Footers, such as print styles, lines printed on, and page numbering. The Header area of a Header/Footer Block contains unique information pertaining to these options.

h. Matrix Element Text Blocks

A matrix is a two dimensional table, or array, of areas of wordwrapped text with each such area being referred to as a cell. The text and attributes of a single such cell are contained in a corresponding Matrix Element Block, a type of IIB 86.

Format lines defining the columns of the matrix are contained in Format IIB 86s are treated as elements of the matrix. The first element of a matrix column is always a format line, there is always a format line for each column of a matrix and a format line may be referenced by any number of Matrix Element Blocks. This restriction on the assignment of format lines, that is, one for each column, allows the columns and rows of the matrix to be easily rotated or interchanged. The text within a cell is unique in that it cannot be modified by any other format line than that appearing with reference to the column containing the cell.

The Matrix Element Blocks and Format Blocks of a particular matrix are located through a Matrix Description Table, which also contains the definition of the matrix. Matrix Description Tables are in turn located through Primary and Secondary Matrix Indexes.

A Matrix Description Table has the same structure as the blocks previously described and contains, as described, the information necessary to completely define a matrix. The Data area contains FRSNs pointing to the text blocks and format lines of the matrix with each FRSN pointing to the beginning of a Matrix Element Block, the smallest unit of a matrix. In addition to the standard information, the Header area identifies the number of rows and columns of the matrix.

Each Matrix Element Block contains normal word-wrapped text and any applicable attributes of a cell of the matrix and are referenced in the Matrix Description Table in row order from left to right.

i. Picture Blocks

A Picture Block contains the name of a file containing, in turn, a graphic, that is, picture and may contain additional information identifying the area of the document to be occupied by the picture. As previously described, Picture Blocks will normally be used with system having bit mapped display and printing capabilities.

j. Voice Blocks

Voice Blocks may contain the names of files containing voice messages, for example, in Digital Voice Store and Forward (DVX) systems.

k. External Data

External Data Blocks may contain the names of files external to the system which contain programs or data operating upon data within the system or used by the system. The provision of External Data Blocks allows, for example, programs residing in external files to be overlayed to operate upon data within a file in the document. External data may also be incorporated into a document through an attribute reference, as described below.

l. Merge Data Blocks

A Merge Data Block is a chain of text which contain encoded instructions for performing merge operations between an external text source and the document. The position of a merge attribute character in a text chain specifies the position at which the merging is to occur. The instructions indicate how to perform the merge operation and there is no restriction on the contents of the merge data chain. Merge data text may contain additional references to other formats, so that columns may be placed in merge chains.

m. Text Insert

A text insert reference is a temporary local reference attribute which does not bear an item number and which consists only of a reference attribute character and a reference word, as described below. The purpose of a Text Insert is to create a forced block break at a point where text is to be inserted.

n. Named Marks

Named Marks are user specified permanent position markers. When applied, the character to be marked is moved to the beginning of a new block and the occurrence of a Named Mark s indicated in the header of the new block, resulting in a forced block break. The block or item number of the new block is then placed in the Named Item Index.

o. Columns

Parallel columns of text appearing in a document are treated as a special case of normal word-wrapped text. The text in a column consists of a portion of a text page chain containing text, visual attributes, and reference attributes. Each column begins with a format line controlling the display of text therein, and has essentially unlimited length. A column may be interrupted by a format break or page break. A column is terminated by another format, which may in turn contain one or more columns and may be at a page break. It is therefore possible to have, in a single page, a region of three columns followed by a region of two columns, and so on. In addition to format data, columns require block linking pointers to connect columns together, if necessary.

Format line and data specifications of columns appearing in a single page are all included into a single format line with multiple codes to delimit the extent of each column.

Column text is stored in a text page chain in sequential form, with the text of the first column in a multi-column region following immediately after the text of the preceding region. The last block of text of the preceding region is chained to the first block of text in the column region, which contain a reference to the formats for the column regions. The last block of the first column is chained to the first block of the next column, and so on to the end of the column region, wherein the last block of the last column is changed to the next succeeding block.

In order to easily perform whole-column operations, the top blocks of each column in a column region are linked together by side pointers located in the format attribute words found at the start of each column.

Having described the various types of IIB 86, the relationship between text and attributes, referred to in the above descriptions, will be described next below.

7. Text and Attributes

As previously described, any IIB 86 may contain, in the Data area, both text and attributes. Attributes, which appear as words written in the lower part of the block Data area may, as previously described, effect the visual appearance of the text, may be descriptive in indicating that a character is to be optionally printed or is to be used in generating a table of contents or an index, or may contain information pertaining to the text, for example, footnotes.

Visual and descriptive attributes are always applied to a range of characters, which may be as short as one character. There may be a number of distinct visual/descriptive attributes appearing in a single block. If the same visual or descriptive attribute is applied to characters separated by at least one characters, to attributes will be present; if, however, the same attribute is applied to consecutive characters, a single attribute will result.

Informational attributes usually appear as units of text or data existing between two text characters and are referenced or incorporated into the text through a reference to a block containing the informational text or data.

Attribute words occupy space in an IIB 86 Data area only when defined. In an IIB 86 containing only text with no assigned attributes, therefore, the text may occupy the entire Data area. Conversely, it is possible to have an IIB 86 wherein the entire Data area is occupied by attribute words. Attribute words are defined only within a Text Block and have meaning and are applicable only within the Text Block; attributes cannot span over two or more Text Blocks.

1. Visual/Descriptive Attributes

Visual/Descriptive attributes are applied by the user over a range of characters appearing in the text, from one character to all characters appearing in the Text Block. Whether or not certain visual attributes are displayable, depends upon the capabilities of Display 48.

A visual/descriptive attribute word will contain information identifying whether the attribute is visual or informational, the position of the first character in the Text Block affected by the attribute, and the position of the last character in the Text Block affected by the attribute. Also included is information identifying the attribute to be applied. Only one attribute is specified by each attribute word and, if text characters have more than one visual attribute, multiple attribute words are required.

Attributes implemented in the present embodiment of the document structure include, but are not limited to, the following:

| | |
|---|---|
| Underline | Color Change |
| Double Underline | Revision Mark |
| Superscript | Subscript |
| Bold | Table of Contents Mark |
| Font Change | Index/Occurrence Mark |
| Merge | Hyphen |
| Character Set Change | Table Of Contents |
| No Break | Strike-Through |
| Optional Text | Index Generation |

2. Informational Attributes

As described above, informational attributes are units of text of data that exist between two text characters. Informational attributes are represented by a unique, unprintable character and by informational attribute words appearing in the attribute area of the Text Block Data area. Only one informational attribute may be associated with the informational character in a single occurrence of the informational character and each informational word may define only one informational attribute.

The data associated with the information character is, for each occurrence, kept in IIB 86s and are located through the Indexing Blocks through their Item Numbers.

An informational attribute word contains information identifying the word as referring to an informational attribute, the type of attribute, and the Item Number of the attribute. The word also contains information identifying the location within the text where the informational attribute takes effect and, in the case of, for example, Picture or Free Form Regions, may identify the horizontal and vertical space required in the document for the attribute.

The forms of informational attribute implemented in the present embodiment include, but are not limited to:

| | |
|---|---|
| Format References | Matrix References |
| Note References | Picture References |
| Free Form Region References | Voice References |
| Footnote References | External Data References |

3. Attribute Sorting Order

The attribute words stored in the attribute area of a Text Block are maintained in a specific order to provide ready and logical access to the words while fetching characters and associated attributes. If two or more attributes begin or are located at the same point in the text, their order is determined first by attribute type, that is, reference attributes, such as informational attributes, will occur prior to visual or descriptive attributes.

Additional Description of a Preferred Embodiment

The present additional description of a preferred embodiment provides more detailed descriptions of certain aspects of the document structure described in U.S. Ser. No. 538,644. The additional description will begin with a discussion of the relationship between disk files, document files, and the document structure of the present invention, will then present overviews of the fully-developed document structure and the document manipulation programs of the present invention, and will finally discuss salient details of the document structure and of document manipulation.

I. Overview of the Document Structure

As pointed out in U.S. Ser. No. 538,644, the document structure is implemented in a document file. FIG. 5 shows the logical structure of the document file in which the present invention is implemented. Document file 501 consists of a set of equal-sized blocks 503. Each block 503 has a number, indicated in FIG. 5 by a value in parentheses. Within a document file, a given block 503 may be located by specifying the block's number. In a present embodiment, each block 503 contains 512 bytes of data and corresponds to two 256-byte disk blocks. In other embodiments, there may be other relationships between a block 503 and a disk block.

The document structure of the present invention is made up of blocks 503 in a document file 501. FIG. 6 presents an overview of the document structure as it is implemented in document file 501. Each block 503 contains a header (H 602). As will be explained in more detail hereinafter, the header contains information including at least the type of its block 503, and may also contain the numbers of other blocks 503. By means of H 602, blocks 503 may thus be linked into chains. The contents of the remainder of block 503 depends on the type of the block. In some blocks 503 (for example, PRIX 611), the remainder contains pointers to other blocks; in others (for example, TB 621), the remainder contains the text 629 of the document represented by the document structure and attributes 631 further describing the text 629.

A. Administrative Blocks

The block types used in the document structure fall into three functional classes: management blocks, index blocks, and text/data blocks. In FIG. 6, the management blocks are represented by bit map (BM) block 601, administration block 1 (AD1) 603, administration block 2 (AD2) 605, and Document Table (DT) 80, These blocks contain information required for the management of the document represented by the document structure. In a present embodiment, they occupy blocks having the same block numbers in all documents. BM 601 contains a bit map which includes a bit corresponding to each block 503 in document file 501 containing the document. The state of the bit indicates whether that block 503 is currently being used in the document structure. If the number of blocks in a document file 501 exceeds the capacity of a single BM 601, additional BMs 601 are chained to the first. Each additional BM 601 has a predetermined block number. AD1 603 and AD2 605 contain information such as the title and author of the document, the date of creation, the date of last access, the location currently being edited in the document, and default values for formatting the document.

DT 80 contains pointers to the index blocks 503 by which the remaining blocks 503 may be located. In a preferred embodiment, there are four pointers, each one pointing to a different type of index. Each pointer specifies the index by specifying the block number of the first block in the index. Here and elsewhere in FIG. 6, the block pointed to by a pointer is represented in the pointer by a letter representing the block's number. Thus, NIP 609 contains the letter a, indicating that it points to block 503(a), which bears the legend NIX 607. NIX 607 is the first block of an index by which names consisting of text strings may be associated with components of the document structure. RIP 613 points to PRIX 611, the first block 503 of an index by which references specified by attributes may be located. PIP 617 points to SPIX 619, the first block of an index by which pages of the document may be located. FIP 629, finally, points to FIX 619, the first block of an index by which the display fonts available for a document may be specified.

B. Index Blocks

Turning to the indexes and beginning with the name index, that index is made up of at least one NIX block 607. NIX block 607 contains NPs 610. Each NP 610 establishes a relationship between a user-supplied character-string name (NA) referring to a component of the document and a value which locates the first block 503 of the component. The value may be a block number, an item number, or a page number. Item numbers are used in the reference index, and page numbers are used in the page index. Thus, a component identified by a name may be located by searching for a NP 610 containing the name in NIX 607, and when it is found, using the value associated with the name in NP 610 to locate the first block 503 of the component. If the number of named components exceeds the capacity of a single NIX 607, an additional NIX 607 is chained to the first, as shown in FIG. 6. In order to simplify searching in a present embodiment, the NPs 610 are arranged by the type of component they point to, and within a type, they are arranged alphabetically by name. In FIG. 6, two NP 610s are shown, one referring to block 503(d) and the other to block 503(f). As will be explained in more detail later, certain components of the document structure may be referred to only by name and are therefore accessible only by means of NIX 607. Most components, however, are accessible through either PRIX 611 or SPIX 619 and may additionally have a name and be accessible through NIX 607.

The reference index establishes a relationship between an item number identifying a reference and the block number of a block 503 containing the reference. A reference is information which is required in addition to the text of a document to produce the document. One example of a reference is the format specifier for a section of a document. The format specifier specifies the form of the document's page, including such matters as the left and right margins, the number and width of columns, and the intervals between tab stops. The reference index in FIG. 6 contains three blocks 503: primary reference index, (PRIX) 611 and two secondary reference index blocks (SRIX) 615. PRIX 611 is used when there are more references in a document than can be contained in a single SRIX 615. PRIX 611 contains secondary reference index pointers (SRIP) 637. Each SRIP 637 associates the high-order bits of an item number (HIN) with the block number of SRIX 615 which contains the block number of the reference itself. SRIX 615 associates the low-order bits of an item number (LIN) with the number of the block 503 containing the reference. Thus, between them, PRIX 611 and SRIX 615 associate an item number specifying a reference with the number of the block 503 containing the reference. For example, in FIG. 6, the SRIP 637 associates the high-order bits with c, the block number of block 503(c), which contains a SRIX 615, and that SRIX 615 associates the low-order bits with d, the block number of REFB 617, which actually contains the reference corresponding to the item number.

The page index establishes a relationship between a page number identifying a page of the document and the block 503 which contains the beginning of the page. Like the reference index, the page index may have primary and secondary index blocks. However, the document of FIG. 6 does not have enough pages to require more than one index block, and thus, there is only one secondary page index block (SPIX) 619. SPIX 619 contains page pointers (PP) 620. Each PP 620 associates a page number (PN) with the number of the block 503 containing the beginning of the page. In FIG. 6, page 627 begins at block 503(f), and thus, PP 620 contains block number f. Within the page index, the PPs 620 are ordered consecutively by page number. If a page is deleted or added, the page numbers in the document are changed and the PPs 620 in SPIX 619 are rearranged accordingly. In order to facilitate renumbering of pages, the SPIXs 619 in documents having more than one SPIX 619 are linked into chains.

The font index, finally, is an index of the type fonts used in the document. The font index supplements a list of fonts contained in AD2 605. When the number of fonts used exceeds the capacity of the list in AD2 605, the overflow is placed in FIX 633; if there are more than can be contained in a single block 503, another FIX 633 is chained to the first. Each font is represented in the font list and the index by a font descriptor (FD) 635. There is an integer corresponding to each FD 635, and a given font is represented in the document by means of the integer corresponding to that font's FD 635.

C. Text Blocks and Text Pages

The text of a document is contained in text blocks (TB) 621. The text blocks making up a document are chained together in sequential order. If the document is subdivided into pages, there is for each page a PP 620 in the page index containing the block number of the first TB 621 in the page. As described in U.S. Ser. No. 538,644, each TB 621 contains two parts in addition to H 602: text 629 and attributes (ATTR) 631. Text 629 contains the characters which will actually appear to a person editing the document. ATTR 631 contains attribute words (AW) 625 which specify additional material to be included in the text when it is printed or displayed, different display fonts, and modifications to the appearance of the text such as underscoring, highlighting, or varied spacing. The additional material may include items such as page headers and footers, footnotes, index entries, graphs, or pictures.

As will be explained in more detail hereinafter, there are three kinds of AWs 625: visual/descriptive AWs 625, font AWs 625, and informational AWs 625. Visual/descriptive AWs 625 specify modifications such as underlining or highlighting and contain all of the information required to specify the modification. Font AWs 625 specify a display font and the range of characters to which it applies. The display font is indicated in the font AW 627 by the number of the font in the font list. Informational AWs 625 specify the additional material. The additional material is contained in a reference, and the informational AWs 625 contain a type value indicating the kind of reference they represent and an item number (IN) identifying the specific reference. As explained in the discussion of the reference index above, the IN is used to locate a block or chain of blocks 503 which contains the information in the reference referred to by the informational AW 625. For many types of references, the position in text 629 at which the reference applies is marked by an attribute character (AC) 623. The AC 623 has a code different from that of any character code, and during an editing session, a character corresponding to AC 623 appears on the user's terminal.

D. References and Reference Blocks

As mentioned in the discussions of reference indexes and informational AW 625, a reference is information which is referred to by an item number in an informational AW 625 and is consequently locatable by means of the reference index. A given reference has only a single item number, but may be referred to by any number of AWs 625. Each of the AWs 625 referring to the reference will contain the same item number. A field in SRIP 637 for a reference indicates how many AWs 625 refer to the reference. The value in the field is incremented each time an AW referring to the reference is added to the document and decremented each time such an AW is removed. SRIP 637 for a reference and its REFBs 617 will be deleted only if the reference count is 0.

The information belonging to a reference is stored in reference blocks. REFB 617 in FIG. 6 is such a reference block. Like TBs 621, REFBs 617 may contain text 629 and ATTRs 631. However, to avoid circular references, there are certain limitations on the use of informational AWs 625 in REFBs 617. A REFB 617 may also contain an external reference, i.e., a reference to another document or to a file containing an item such as a graph or a picture. If the information required for an informational AW 625 exceeds the capacity of a single REFB 617, additional REFBs 617 are chained to the first REFB 617. However, only the location of the first REFB617 is included in the reference index.

E. Named References and Pages

As mentioned above in the discussion of the name index, any reference or text page may be referred to by a name as well as by its item number or page number. Such a reference or text page has an entry in the name index as well as in the reference index or page index and is accessible via the name index as well as via the reference index or page index.

F. The Indexes and Document Restructuring

As may be seen from the above discussion, neither a TB 621 or a REFB 617 contains a reference by block number to a block 503 which is contained in a different chain of blocks 503. The only references to blocks in other chains are via item numbers in AWs 625. Further, references by block number to other blocks within a chain are found only in Header 602 and, as will be explained in more detail later, in a certain type of AW 625. The references in the header are only to the immediately preceding and following blocks 503 in the chain, and those in the AW 625 are limited to blocks 503 in the same page 627 as that containing the block 503 with the AW 625. Similarly, names in the name index refer to pages 627 and references by page number and item number, not by block number.

A major advantage resulting from the use of page numbers and item numbers to reference components of a document outside of a given chain of blocks 503 is that the blocks 503 in a chain of TBs 621 or REFBs 617 may be rearranged without affecting chains of REFBs 617 referred to within that chain. Further, the effects of any rearrangement of TBs 621 in a page 627 are limited to the TBs 621 in that page and to the TB 621 in the chain immediately preceding the first TB 621 in the page and the TB 621 immediately following the last TB 621 in the page.

The above-described limitations on the effects of rearrangement makes it easy to compact a document in the present invention. Such an operation is advantageous because the process of editing a document tends to produce chains in which many TBs 621 or REFBs 617 occupy adjacent positions in the chain but widely separate positions in the document file 501 containing the document and many TBs 621 or REFBs 617 contain relatively little text. The compaction operation takes such a document and produces a copy in which as many TBs 621 and REFBs 627 as possible are full and in which blocks 503 which occupy adjacent positions in a chain tend to occupy adjacent positions in document file 501. The compacted document thus requires a smaller document file 501 than the original document and may be accessed more quickly for operations such as display on a terminal or printing.

The properties of text and reference chains and indexes described above permits compaction of a document by page 627 or reference. Rearrangement or reduction of the number of blocks within a page 627 or reference affects only that page 627 or reference. Once rearrangement of the page or reference is complete, only the PP 620 for the page or the RP 614 for the reference and any NPs 610 referring to the page or reference need be reset to point to the new first block 503 of the page or reference.

II. Overview of the Document Manipulation System

Document structures of the present invention are manipulated by a documentation manipulation system. The discussion now turns to that system, beginning with the manner in which the routines which make up the system are organized, continuing with a discussion of certain data structures used by these routines, and ending with a discussion of the general mode of operation of the document manipulation system.

A. Organization of the Document Manipulation System

As pointed out in U.S. Ser. No. 538,644, the document structure of the present invention is manipulated by a single library of routines termed the Document Manager Library or DMLIB. The use of a single DMLIB by all programs which access a document represents a significant departure from the prior art shown in FIG. 7. In the prior art, each application program (AP) which altered or read the contents of a document 701 had its own group of document manipulation routines (DMR) for manipulating the document. For example, an editing program for writing a document 701 had one group of such routines, while a program for printing a document had another group of such routines. Thus, as shown in FIG. 7, there could be APs 703(A) . . . (N), each with its own different corresponding DMR 705(A) . . . (N). Such an approach has numerous disadvantages. First, there is a great deal of duplication of programming effort. Most of the APs 703 will perform functions like reading characters from document 701, and each of the DMRs 705 for these APs will have its own routine for reading characters. Second, each essentially duplicate routine in the various DMRs requires its own storage, and thus increases the storage requirements for the application programs. Third, maintenance and enhancement of the document structure used in documents 701 is made more difficult. Any of the DMRs 705 may have a bug which damages the document structure, and when such a bug occurs, the DMR 705 in each of the APs 703 must be checked for the error. Further, any change in the document structure requires modification of all of the DMRs 705 which manipulate the document. In the present invention, as shown in FIG. 8, all manipulation of documents 805 having the present invention's document structure is done by invoking routines in DMLIB 801. The various APs 803(A) . . . (B) no longer have their own DMRs. For example, if an editing AP 803 wants to display a page of a document on a CRT screen, it invokes the same routine in DMLIB 801 to read the page from the document as does a printing AP 803 which wishes to print the page. By thus combining all of the document manipulation routines into DMLIB 801, the present invention eliminates duplication of programmer effort, reduces the amount of storage required for APs 803, and makes it easier to maintain and enhance the present invention's document structure.

While the basic principle of using a single DMLIB 801 for all APs 803 is not limited to document structures like those of the present invention, the present embodiment of DMLIB 801 is organized into groups of routines which correspond to the components of the present invention's document structure. These groups include the following:

Buffer Routines: These routines manage buffers 54 in which blocks 503 are stored when they are being manipulated.

File Initialization Routines: These routines initialize a document file 501 as required for a document.

Administration Block Routines: These routines insert information into and retrieve information from the administration blocks in the present invention's document structure.

Character Routines: These routines retrieve characters from and place them in text 629 of a TB 621 or a REFB 617. They further return attribute information about a character.

Sequential Access Routines: These routines take advantage of the fact that TBs 621 are chained together to provide fast sequential access to the text of the document. The access includes reading characters and their attributes.

Visual Attribute Routines: These routines set, read, and delete visual/descriptive AWs 625 and the ACs 623 associated with them.

Reference Attribute Routines: These routines set, read, and delete informational AWs 625 and the ACs 623 and REFBs 617 associated with them.

Page Routines: These routines locate, make and delete pages and page-related information such as headers and footers.

Format routines: These routines get, set, and otherwise manipulate document format information.

Column routines: These routines create, delete, and manipulate columns in a document.

Header and Footer Routines: These routines permit an AP 803 to add, delete, and modify page headers and footers.

External Reference Routines: These routines permit AP 803 to make or read an external reference, i.e; a reference to information located elsewhere than in the document. Examples of external references are other documents, pictures, voice documents, drawings, and graphs.

Shelf Routines: These routines permit an AP 803 to add, delete, or modify text shelves. Text shelves are chains of blocks 503 used as temporary storage in a document.

Editing Routines: These routines permit an AP 803 to delete text from a document, move text from one position in a document to another, copy text from one position to another, move or copy text between a other parts of a document and a shelf, and create a place in a document at which text may be inserted.

Name Routines: These routines permit an AP 803 to name an item or page by creating a NIP 610, delete a name, retrieve the item or page number identified by a name, and determine the name corresponding to an item or page number. They also permit an AP 803 to insert a named mark identifying a location in the text of a document into or remove it from a document.

Font Routines: These routines permit an AP 803 to add or remove fonts from the font list and determine a font from the font number in a font AW 625.

Document Management Routines: These routines permit an AP 803 to create a compacted copy of a document. Compaction involves combining the contents of chained blocks 503 so that the fewest number of blocks 503 possible are required for the contents and using blocks 503 which are adjacent to each other in document file 501 as adjacent blocks 503 in chains of blocks 503.

One of the particular features of the present invention is the availability of text editing routines such as character insertion routines (in the Character Routines), deletion, move, and copy routines (in the Editing Routines) to any AP 803. In prior art document processing systems, such routines were generally part of an editing AP 803 and were not available to other APs 803. In consequence, the easy and powerful text handling interface of the editing AP 803 was not available to other APs 803 which required some text handling capability. For example, in an interactive AP 803 in prior art systems, the user only had limited editing capabilities available for editing his input to the interactive program; in the present invention, an interactive AP 803 may use any of the editing capabilities available from DMLIB 801.

B. Data Structures Employed in Operation of the Document Manipulation System As mentioned in U.S. Ser. No. 538,644, the document processing system in which the present invention is embodied provides data structures stored in DAS 60 to the routines of DMLIB in order to manipulate documents and obtain information about them. These data structures include the File Reference Block (FRB), which contains information about the document file 501 which contains the document currently being edited, the Buffer Table (BT), which is a table of the buffers in Buffers 54 being used to hold blocks 503 belonging to the document being edited, the Document Control Block (DCB), which contains information about the document currently being processed, and one or more position blocks (PB), which specify positions within a document In the following, the DCB, BT, and PB are discussed in detail. All three are shown in FIG. 9.

1. DCB 901

DCB 901 relates the document currently being manipulated by an AP 803 to document file 501 in which it is contained and to the BT which describes the buffers in Buffers 54 which contain blocks 503 from the document. DCB 901 contains the following fields:

FRB PTR 903, which contains the location of the FRB for the document file 501 containing the document currently being manipulated.

BT PTR 905, which contains the location of the BT describing the buffers in Buffers 54 currently being used to manipulate the document.

FA 907, which contains information used to control access to the document.

UID 909, an identifier which is unique to the document represented by DCB 901, and which is used to mark all blocks 503 belonging to that document.

NIP 911, the value of NIP 609 in DT 80, which, as previously mentioned, contains the location of the first block 503 of the name index.

By examining a document's DCB, an AP 803 may thus determine the locations of the FRB for the document's document file 501, the BT for its buffers, the kind of access available to the document, the document's UID, and the location of the name index.

2. BT 913

Buffer Table 913 contains a header 915 and a number of entries 917. Each entry 917 represents one of the buffers presently available to manipulate the document. Fields of interest in header 915 are NB 919, which specifies the number of buffers in the table and SP 921, which indicates which page in buffers 54 the buffers specified in the table begin on. Fields of interest in Entry 917 are BN 925, which contains the number of block 503 presently contained in the buffer, RN 927, which is the system number of the document file from which the block came, LRUV 929, which is used to determine which buffer in the table is to be overwritten when another buffer is required, and BSP 931, which specifies the page in buffers 54 at which the buffer represented by the entry begins.

3. PB 933

In order to refer to a position in a document, an AP 803 uses a PB 933. Procedures in DMLIB 801 provide the information contained in the PB and respond to that information. The fields are the following:

BN 935, which contains the number of block 503 containing the location specified by PB 933.

TO 937, which contains the offset from the beginning of text 629 of the location specified by PB 933.

CT 939, which specifies the type of chain to which block 503 containing the specified location belongs. The chain may be a chain of TBs 621, of REFBs 617, or of index blocks.

LOC 941, which contains the page number of the page 627 to which the block 503 belongs if the block is a TB 621 and the item number of the reference to which the block 503 belongs if it is a REFB 617.

CN 943, TCBN 945, and NC 947 all contain information about columns at the location specified by PB 933. CN 943 is the number of the current column, TCBN 945 is the block number of the block containing the top of the current column, and NC 947 indicates the number of columns at the location.

C. Overview of Operation of the Document Processing System

In the following, two examples will be used to illustrate the general manner in which routines in DMLIB 801 operate on a document. The first example is printing a document, the second is inserting characters into a document.

An AP 803 which wishes to print a document first uses a routine in the file initialization routines to open the document file 501 containing the document. It then employs a GO TO PAGE routine in the page routines to locate the first page 627 of the document. The GO TO PAGE routine takes a page number as an argument, uses the page number and the page index to locate the first TB 621 in the page 627, and returns a PB 933 with its fields set as required for the first block 503 in the specified page.

Once the AP 803 has the PB 933 for the first TB 621 on the first page, it can use the sequential access routines to rapidly read the document. These routines begin reading sequentially at a position specified by a PB 933. In this case, the PB 933 specifies the first page of the document, and so the reading begins at that point. The reading is done by a GET CHARACTER AND ATTRIBUTES routine which sequentially retrieves a character from text 629 and stores it in a buffer. The character is accompanied by any attribute associated with it in ATTR 631. In the case of visual/descriptive attributes, the GET CHARACTER AND ATTRIBUTES routine returns an 8-byte bitmap of the visual/descriptive attributes associated with the character. In the case of informational attributes, the routine returns the type and item number of the reference represented by the attribute.

After the AP 803 doing the printing has accumulated a number of characters and attributes, it can invoke a sequential access routine which returns a PB 933 specifying the current position. save the PB 933, and interpret the accumulated characters. Where the characters have only visual/descriptive attributes, the AP 803 can interpret the characters and their associated visual attributes in the manner required by the device which is actually doing the printing.

In the case of an informational attribute, the AP 803 can use a routine called GO TO REFERENCE ITEM CHAIN in the reference attribute routines to locate the REFBs 617 containing the information required for the reference. The GO TO REFERENCE ITEM CHAIN routine takes a reference type and a reference item number and returns a PB 933 specifying the beginning of text 629 in the first of the REFBs 617 containing the information. The AP 803 doing the printing can then use GET CHARACTER AND ATTRIBUTES as described above to obtain the text 629 for the reference, and when that is finished, use the PB 933 saved after the AP 803 ceased reading text 629 from the TB 621 to resume reading the text. AP 803 can continue as just described until it has printed all of the text contained in the document, and can then use one of the document initialization routines to close the file.

As may be seen from the preceding discussion, the general method of using DMLIB 801 is to get a PB 933 for the block 503 containing the desired text 629 and then use the PB 933 in a routine which performs the desired operation on the text 629. The PBB 933 is obtained by means of routines which take one of the values used to index the document, use the index to locate the desired block 503, and then return the PB 933 for the desired block. This same general method is used to insert characters. First, a PB 933 for the location at which the characters are to be inserted is obtained; then a routine in the character routines called PUT CHARACTER is called using the PB 933 and the character to be inserted. PUT CHARACTER inserts the character at the location specified by the PB 933 and resets PB 933 to point to the inserted character. The effect of PUT CHARACTER on the document depends on whether the insertion is occurring in the middle of or at the end of text 629. If it is happening in the middle, the character at the position specified by PB 933 is overwritten by the inserted character; if it is occurring at the end of text 629; the character is added to text 629. As will be explained in more detail later, the editing routines contain a routine which splits a block 503 at a point specified by a PB 933 so that characters may always be inserted at the end of text 629.

III. Detailed Discussion of Certain Components of the Document Structure

In the following, certain components of the document structure will be discussed in detail. Where necessary for understanding of the present invention, certain interactions between DMLIB 801 and these components will also be discussed. The components include the header 602, text 629, and attribute portions 617 of TBs 621 and REFBs 617, pages 627, and components represented by name.

A. Detailed Description of TB 621

FIG. 10 provides a detailed representation of TB 621. Beginning with Header 602, the fields contained therein are common to all blocks 503, though certain fields are not used in some block types. The fields are the following:

BT 1001 specifies the type of block 503; in the present case, it specifies that block 503 is a TB 621.

AUX 1003 contains auxiliary information. For example, in TB 621, the field specifies whether a break between the text in the present TB 621 and that in the preceding TB 621 in the chain is required.

NL 1005 contains the block number of the next TB 621 in the chain to which the present TB 621 belongs.

PL 1007 contains the block number of the preceding TB 621 in the chain to which the present TB 621 belongs.

TO 1009 contains the offset from the beginning of TB 621 of the last valid text character in Text 629.

AO 1011 contains the offset from the beginning of TB 621 of the first AW 625 in ATTR 631.

UD 1013 contains unique data required for certain block types.

UID 1015 contains a value which is unique for a given document and which is present in this field in all blocks 503 belonging to the document. The UID allows reconstruction of a document after system failure.

As previously explained in the overview, Text 629 contains the characters which actually make up the document and attribute characters representing informational AWs 625; ATTR 631 contains the AWs 625. All blocks 503 which contain text which appears in the document have the same arrangement of text 629 and ATTR 631; the AO 1011 and TO 1009 fields respectively permit routines which manipulate attributes and text to locate those portions of text 629 and ATTR 631 which currently contain data.

B. Detailed Discussion of Attribute Words 625

As mentioned in the overview, in terms of function, there are three types of attribute words 625: visual/descriptive attribute words, font attribute words, and informational attribute words. These functional types are implemented by means of three data structures, shown in FIG. 11 as short descriptive attribute word (SDAW) 1101, long descriptive attribute word (LDAW) 1111, and informational attribute word (IAW) 1115. Each attribute word 625 has a type field, TY 1103, which indicates which of the kinds of attributes is represented by the AW 625. Each attribute word 625 also has a field which indicates the point at which the attribute specified by the AW 624 is effective. In SDAW 1101 and LDAW 1111, the field is SO 1107, which indicates the beginning of the area of text 629 in which the attribute is effective; in IAW 1115, it is AC OFF 1119, which specifies the offset of AC 623 corresponding to IAW 1115 in text 629.

Turning now to SDAW 1101, that form of AW 625 is used for font attributes and for certain visual/descriptive attributes. In SDAW 1101, EO 1109 indicates the last character to which the font or the visual/descriptive attribute word 625 applies. Thus, SO 1107 and EO 1109 between them determine the range of characters to which the attribute represented by SDAW 1101 applies. Data 1105 contains data further specifying the attribute; in the case of font attributes, Data 1105 contains the number of the font which is to be used in the range of characters specified by SO 1107 and EO 1109. As previously mentioned, the number may be used together with AD2 605 and FIX 633 to locate a descriptor for the font. LDAW 1111 has the same basic structure as SDAW 1101, except that the data required to further specify the attribute is contained in Data 1113.

Continuing with IAW 1115, in addition to the fields already mentioned, that class of attribute words 625 includes AUX field 1117, containing auxiliary type information, IN field 1121, which contains the item number by which the information referred to by IAW 1115 may be located using the reference index, and Data 1123, which is again data further specifying the attribute.

C. Arrangement of Attribute Words 625 in ATTR 631

As previously explained, all AWs 625 for text 629 contained in a block 503 are stored in ATTR 631 of that block. Within ATTR 631, the AWs 625 are ordered from first AW 625 to last by the values of their SO field 1107 or AC OFF field 1119, i.e; the order of AWs 625 in ATTR 631 corresponds to the order of the characters to which they apply in text 629. If there is more than one AW 625 which has a given value of SO 1107 or AC OFF 1119, for example, a font AW 625 and a visual/descriptive AW 625 which both specify attributes beginning with the same character, the AWs 625 with the same value of SO 1107 or AC OFF 1119 are ordered by the value of their TY fields 1103. Because the AWs 625 occur in the same order in ATTR 631 as that of the characters which they modify in text 629, routines in DMLIB 801 such as the GET CHARACTER AND ATTRIBUTES routine previously described can easily determine whether a character at a given offset in text 629 has a corresponding AW 625 and can easily retrieve information from any such corresponding AW 625.

D. Detailed Discussion of Format References

As pointed out in U.S. Ser. No. 538,644, the present embodiment has many different types of references. The discussion now turns to one type of reference, the format reference. A format reference determines the margins, number of columns, and spacing of tab stops for the portion of the text of a document following the AW 625 specifying the format reference. In a present embodiment, each portion of a document which has a format different from the preceding portion must begin in a new TB 621. In that TB 621, the first AW 625 in ATTR 631 is a format attribute word (FAW) for the format reference. The FAW contains the item number by which the first format reference block (FREFB) for the format reference may be located. FIG. 12 shows both the FAW and the FREFB.

FAW 1201 is an IAW 1115, and consequently has the fields previously explained. TY 1103 contains the type code for FAWs; AUX 117 may contain codes indicating that TB 621 containing FAW 1201 is the location of a soft or hard page break. In the first case, TB 621 currently is the first TB 621 in a page 627, but there is no requirement that it be so. In the second case. TB 621 must be the first TB 621 in the page 627. In either case, TB 621 presently is pointed to by a page pointer (PP) 620 in the page index. Establishing a document page in a present embodiment thus involves inserting a new TB 621 into the document at the point where the new page is to be established, placing a FAW 1201 for the page's format reference into ATTR 631 of the new TB 621. setting AUX 117 in FAW 1201 to indicate the proper kind of page break, creating a PP 620 for the page, and rearranging SPIX 619 as required.

The fields in Data 1123 are principally concerned with columns of text. The manner in which text columns are organized will be explained in detail later. The fields are the following:

CC 1203 gives the number of columns in the area of the document which contains TB 621.

CID 1205 gives the number of the column which begins at TB 621.

NC 1207 contains the block number of TB 621 at which the next column begins.

PC 1209 contains the block number of TB 621 at which the previous column begins.

RT 1211 indicates whether headers and footers appear on all pages or on alternate pages. The field is used only when TB 621 is the first TB 621 in a region of text having different headers and footers from the preceding region.

Continuing with FREFB 1213, FREFB 1213 has a header 602, text 629, and ATTR 631. The contents of text 629 determine the margins, tab spacing, number of columns, column width, and intercolumn separation in the region of the text folling FAW 1201. ATTR 631 contains a format data block 1215 corresponding to each column in the format specified by text 629. In a present embodiment, there may be up to 12 format data blocks 1215 in FREFB 1213. The fields in format data block 1215 are the following:

LS 1217 specifies the line spacing in the column to which it corresponds.

J 1219 specifies the justification of the text in the column.

FN 1221 specifies the number of the default font for the column. This is the font which is used in the column unless a font AW 625 specifies a different font for a sequence of characters. The font number specifies an entry in the document's font index.

LPI 1223 specifies the lines per inch in the column.

As may be seen from the above, each column may have its own line spacing, justification, default display font, and lines per inch.

Continuing with FIG. 13, that figure shows how columns appear in a chain of TBs 621. In FIG. 13, the text is in two columns, column 1 1301 and column 2 1303. Each column contains two TBs 621. The first TB 621 in each column is linked via its FAW 1201 to the first TB 621 in the preceding column (if any) and the first TB 621 in the following column, or if there is none, to the next TB 21 in the chain. As shown in FIG. 13, the links are contained in the NC 1207 and PC 1209 fields of the FAW 1201. In the first TB 621 of the first column, PC 1209 has the value 0 if the preceding region of the text has only a single column. Otherwise, it has the number of the first TB 621 in the last column in the region. NC 1207 contains the block number of the first TB 621 of the second column; in the first TB 621 of the second column, PC 1209 contains the block number of the first TB 621 of the first column and NC 1207 contains the block number of the first TB 621 following the second column. PC 1209 in the first TB 621 following the second column contains the block number of the first TB 621 in the second column. Because PC 1209 in the first following TB 621 contains that block number, an AP 803 moving backwards through a chain of TBs 621 can determine from FAW 1201 in the TB 621 immediately following a set of columns that it is entering a region of the text having columns. The links further permit easy determination of which format data block 1215 applies to which TBs 621 and which TBs 621 contain the text of a column during compaction operations.

F. Detailed Discussion of Named Components

As previously pointed out, a name is a character string defined by a person or program working on a document which that person or program may use to refer to a component of the document such as a reference, a page, a named mark, or a text shelf. A named mark marks a specific character in text 629, and may be used by the person or program working on the document to label locations within the document. A text shelf is a component of a document which the person or program working on the document may use for temporary storage of text. The relationship between a name and the component which it represents s established by a name pointer (NP 610) in NIX 607, and a named component may be located by means of the NP 610 for the name.

Naming a page or a reference has no effect on the page or reference itself. It affects the indexes as follows: in the case of a named page, a NP 610 is established which relates the name to the pages 627's page number and a bit in the PP 620 is set to indicate that the page is named. In the case of a named reference, a NP 610 is established which relates the name to the reference's item number and a bit in the item number's SRIP 637 is set to indicate that the item is named.

A named mark is established by splitting TB 621 or REFB 617 containing the character being marked at the character specified for the mark. All characters preceding the position of the specified character and all AWs 625 associated with those characters remain in the original TB 621 or REFB 617. A new block 503 is then inserted in the chain following the original TB 621 and the remaining characters and AWs 625 associated with them are placed in the new block 503. AUX field 1003 in the new block 503 is set to indicate that a forced break (i.e., that the first character in the block must always be its present first character) was made for the name and the block number of the new block 503 is placed in the NP 610 for the name which was specified for the mark. Setting AUX field 1003 to indicate a forced break for a named mark makes it possible to add text to or delete text from the document containing the named mark without affecting the relationship between the name and the character with which the mark is associated.

A shelf is simply a chain of blocks 503 which is temporarily holding data. NP 610 for the shelf contains the shelf's name and the block number of the first block 503 in the shelf, and thereby associates the name with the shelf. There are two types of shelves: those named by a person or program working on a document and accessible to him by means of the name, and those having special system designations. These latter shelves are not accessible to the user and are used to store data used by APs 803 to perform certain operations. Among these operations are search and replace operations involving an entire document and the operation of "undoing" an operation previously performed by the user. In a present embodiment, the shelf for the latter operation has a null name.

A portion of a document may be copied or moved onto a shelf. When a portion of a document is copied, the reference counts in any SRIPs 637 for items in the portion copied are incremented. When a portion is moved, the page numbers for the pages 627 contained therein are deleted from the page index and the entries in the page index are rearranged accordingly. If pages 627 are moved or copied from a shelf back to the document, the required page numbers are added to the page index and the index is again rearranged. Except for the names of pages, names originally associated with a portion of a document are no longer associated with the portion when it is on a shelf. When a named page 127 has been moved onto a shelf, the NP 610 for the name is reset indicate that the page is currently in a shelf.

G. Inserting New Text Characters into a Document

If new text characters must be inserted into a document, the easiest place to do it is at the end of text 629 in the block 503 concerned, since there is no danger that addition of a text character or attribute will unexpectedly exceed the capacity of the block 503. Further, if text is always inserted at the end of text 629, there is no difference between the operation of inserting additional text into a document and adding it to the end of the document, and the same routines may be used for both operations.

In the present invention, text characters are always inserted at the end of text 629 and furthermore, a new insertion may be commenced during the course of a previous insertion. To achieve this end, the present invention proceeds as follows: first, it inserts a new block 503 into the chain following the block 503 into which text is to be inserted. BT Field 1001 in the new block is set to indicate that the new block is part of a text insertion region. Next, the present invention places an AC 623 at the beginning of text 629 in the new block and a text insert AW 625 corresponding thereto in the new block's ATTR 631. The text insert AW 625 does not have an item number and serves purely to mark that an insert operation has begun at the point specified by the AC 623 associated with the text insert AW 625. Then it copies the characters in text 629 following the point of insertion and the AWs 625 associated with them into the new block. The copied text and AWs 625 are effectively deleted from the block in which the insertion is taking place by resetting TO 1009 to point to the character immediately preceding the insertion point. The point of insertion is thus now at the end of text 629 in the block 503 being operated on. At this point, the characters to be inserted may be added at the end of text 629. As each character is inserted, TO 1009 is updated to point to the new final character. If the person doing the insertion decides while he is inserting that he wishes to insert characters elsewhere, the operation just described may be repeated. At the end of all insertion operations, the text in the blocks 503 in which the insertions took place and in the blocks 503 which were added in the course of the insertion operation is ,compacted as best possible. In the course of compaction, the text insert AWs 625 and the ACs 623 associated with them are removed and the resulting blocks 503 are given the block type of the block in which the insertion occurred. An important collateral advantage of the technique just described is that if there is a failure before the insert operation is complete, the presence of text insert AWs 625 in a block 503 indicates that an insertion was taking place when the failure occurred.

IV. Conclusion

The foregoing Additional Description of the Preferred Embodiment has shown how the document structure of the present invention permits efficient sequential operations and location of components of documents by name, item number, and page number. It has further shown how the text of a document may be accompanied by attribute words specifying the appearance of the text and additional information needed in displaying the text and how the attribute words specifying additional information employ item numbers to refer to references which contain the information.

The Additional Description has also disclosed the structure of the DMLIB of the present invention and has shown how routines in the DMLIB operate on the document structure to perform operations on documents. Finally, the Additional Description has provided detailed disclosure of certain components of the document structure and of certain operations which may be performed using the document structure.

The preferred embodiment disclosed herein is however only one possible embodiment of the invention, which may be embodied in other forms without departing from the spirit thereof. For example, blocks 503 and AWs 625 with types other than those described herein, other block sizes, and other kinds of document files may be employed. Further, in other embodiments, there may be greater or fewer numbers of administration blocks and the administration blocks may not be at fixed locations. Finally, the DMLIB may contain more or fewer classes of routines than those described herein. Thus, the preferred embodiment disclosed herein is to be considered in all respects illustrative and not restrictive, the scope of the invention being indicated by the appended claims rather than the foregoing description, and all changes which come within the meaning and range of equivalency of the claims are intended to be embraced therein.

What is claimed is:

1. In a document processing system including storage means for storing blocks of data and processing means for processing the data blocks and wherein a document is represented by a chain of text blocks of the data blocks in the storage means which contains test belonging to the document, the chain being formed by means of chaining information in each text block by means of which the processing means locates the following block in the chain, the method of inserting characters into the text contained in the chain at a given position in the text comprising for any insertion of characters the steps of:
   (1) immediately following a first text block containing the given position, inserting a second empty text block marked with an insertion mark into the chain by copying the chaining information from the first text block into the second empty text block and setting the chaining information in the first text block to specify the second empty text block;
   (2) copying the text which follows the given position in the first text block into the second text block;
   (3) deleting the copied text from the first text block;
   (4) inserting the characters at the end of the text remaining in the first text block; and
   (5) on completion of the insertion, removing the insertion mark.

2. In a data processing system including storage means for storing at least routines and data and processing means for executing the stored routines and processing the data under control thereof, means for processing a document comprising:
   (1) a document structure of the data for representing the document and
   (2) document management routines that are a subset of the stored routines and are predefined for use by a plurality of application programs for performing operations on behalf of a plurality of application programs, including reading and modifying the document, on the document structure, the document management routines being the only means available in the data processing system for performing operations on the document structure and being employed by any other of the stored routines to perform an operation on the document structure.

3. In the means for processing documents of claim 2 and wherein:
   the document structure includes text made up of characters; and the document management routines include
      a routine for inserting a character into the document structure,
      a routine for copying text contained in the document structure from one position within the document structure to another position within the document structure,
      a routine for moving text contained in the document structure from one position within the document structure to another position within the document structure, and
      a routine for deleting text contained in the document structure.

4. In a document processing system for processing documents, the document processing system including storage means for storing blocks of data at predetermined locations in the storage means and processing means for locating and processing the data blocks, a document structure for representing a document in the storage means by means of the data blocks and permitting the processing means to locate the data blocks as required to process the document, the document structure comprising:
   (1) a plurality of chains of at least one data block, the data blocks in a given chain including chaining information used by the processing means to locate the next data block in the chain when processing the chain, the plurality of chains including
      (a) a first chain which represents text belonging to the document;
      (b) a second chain which represents a reference specifying information additional to the text of the document;
   (3) in a data block of the first chain, a reference specifier specifying the reference; and
   (4) a reference index which relates the reference specifier to the location in the storage means of the first data block in the second chain independently of the position of the reference specifier in the first chain and which the processing means employs to locate the reference for processing when the processing means encounters the reference specifier while processing the first chain.

5. In the document structure of claim 4 and wherein:
   the block containing the reference specifier includes
      a text part containing character codes representing text and
      an attribute part containing the reference specifier.

6. In the document structure of claim 5 and wherein:
   the text part further contains a non-printable attribute code for indicating the position in the text part at which the reference specified by the reference specifier applies.

7. In the document structure of claim 5 and wherein:
   the attribute part contains a plurality of reference specifiers and the order of the reference specifiers in the attribute part indicates the order in which the references specified by the references specifiers apply to the text part.

8. In the document structure of claim 5 and wherein:
the reference specifier in the attribute part is contained in an attribute word which further includes a location specifier specifying the location in the text part at which the reference specified by the reference specifier applies.

9. In the document structure of claim 4 and wherein:
the reference belongs to one of a plurality of types indicating the function of the reference in the document; and
the reference specifier in the attributable part is contained in an attribute word which further includes a first type specifier indicating the type of the reference specified by the reference specifier.

10. In the document structure of claim 9 and wherein:
each block in the second chain includes a second type specifier indicating the type of the reference.

11. In the document structure of claim 4 and wherein:
the reference specifier is an item number identifying the reference; and
the reference index indexes the reference by item number.

12. In the document structure of claim 4 and wherein:
the document structure further includes at least one index block of the blocks; and
the reference index is contained in the index block.

13. In the document of claim 12 and wherein:
the document structure includes a plurality of references;
the reference index exceeds the capacity of a single index block; and
the reference index includes
a plurality of secondary index blocks in which the processing means locates the references by their reference specifiers; and
a primary index block by which the processing means locates the secondary index blocks.

14. The document structure set forth in claim 4 and wherein:
the document structure further includes
a first plurality of the second chains, each second chain representing one of a plurality of the references, and
a second plurality of the reference specifiers, each of the reference specifiers specifying one of the references;
the reference specifiers are included in certain of the data blocks in both the first chain and the first plurality of second chains; and
the reference index relates each reference specifier to the location of the first data block in the second chain representing the reference specified by the reference specifier.

15. In a document processing system for processing documents, the document processing system including storage means the storing blocks of data and processing means for locating and processing the data blocks, a document structure for representing a document in the storage means by means of the data blocks and permitting the processing means to locate the data blocks as required to process the document, the document structure comprising:

(1) a plurality of chains of data blocks, the data blocks in a given chain including chaining information used by the processing means to locate the next data block in the chain when processing the chain, the plurality of chains including
  (a) a page chain of at least one text block of the data blocks, the page chain representing at least one page of text of the document and
  (b) a reference chain of at least one reference block of the data blocks which represents a reference specifying information additional to the text of the document;
(2) in a text block, an information attribute word containing an item number referring to the reference;
(3) a page index block of the data blocks which contains page index information relating a certain page number to the page and which the processing means employs to locate the page when the processing means receives the certain page number in the course of processing the document; and
(4) a reference index block of the data blocks which contains reference index information relating the item number to the location of the reference chain representing the reference and which the processing means employs to locate the reference for processing when the processing means encounters the information attribute word in the course of processing the page chain.

16. The document structure as set forth in claim 15 and further comprising:
a name index block of the data blocks which contains name index information relating a character-string name to the certain page number and which the processing means users to locate the page when the processing means receives the character-string name in the course of processing the document.

17. The document structure as set forth in claim 15 and further comprising:
a name index block of the data blocks which contains name index information relating a character-string name to the item number and which the processing means uses to locate the reference when the processing means receives the character-string name in the course of processing the document.

18. The document as set forth in claim 15 and wherein:
each data block has a block number;
the processing means locates data blocks by block numbers, and
the document structure further comprises a name index block of the data blocks which contains name index information relating a character-string name to a block number and which the processing means uses to locate the block when the processing means receives the character-string name in the course of processing the document.

19. The document as set forth in claim 18 and wherein:
the plurality of chains of data blocks further includes a text shelf chain;
the name index information relates the character-string name to the block number of a data block in the text shelf chain; and
the processing means uses the name information to locate the text shelf when the processing means receives the character-string name.

20. The document structure as set forth in claim 18 and wherein:

the document structure further comprises a named mark attribute word in a text block;

the name index information relates the character-string name to the block number of the text block containing the name mark attribute word; and the processing means uses the name information to locate the text block containing the named mark attribute when the processing means receives the character-string name.

21. The document structure as set forth in claim 16 and wherein:

the text blocks and reference blocks contain codes for characters;

the processing means processes the text blocks and reference blocks by displaying the characters represented by the codes as determined by display fonts represented by font descriptors; and the document structure further comprises a font attribute word including a font number representing one of the display fonts in a text block and a font index block of the data blocks which contains font information relating a font number to a font descriptor for the font represented by the font number and which is used by the processing means when the processing means encounters a font attribute word while processing the page chain to locate the font descriptor represented by the font number in the font attribute word.

22. The document structure set forth in claim 15 and wherein:

the document structure further includes a first plurality of the reference chains, each reference chain representing one of a plurality of the references, and a second plurality of the information attribute words, the item number in each of the information attribute words specifying one of the references;

the information attribute words are included in certain of the data blocks in both the first chain and the first reference chains; and the reference index relates each item number to the location of the reference chain representing the reference specified by the item number.

* * * * *